United States Patent
Bachman et al.

(10) Patent No.: US 12,226,762 B2
(45) Date of Patent: Feb. 18, 2025

(54) ANTIOXIDANT PROTECTION FOR ION EXCHANGE RESINS

(71) Applicant: Evoqua Water Technologies LLC, Pittsburgh, PA (US)

(72) Inventors: Gregory Bachman, Loves Park, IL (US); Marty Wilkes, Roscoe, IL (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 18/507,580

(22) Filed: Nov. 13, 2023

(65) Prior Publication Data
US 2024/0189807 A1    Jun. 13, 2024

Related U.S. Application Data

(63) Continuation of application No. 16/969,548, filed as application No. PCT/US2019/017627 on Feb. 12, 2019, now Pat. No. 11,845,074.
(Continued)

(51) Int. Cl.
*B01J 49/60* (2017.01)
*B01J 47/14* (2017.01)
(Continued)

(52) U.S. Cl.
CPC .......... *B01J 49/60* (2017.01); *B01J 47/14* (2013.01); *B01J 49/53* (2017.01); *C02F 1/42* (2013.01); *C02F 2001/425* (2013.01)

(58) Field of Classification Search
USPC .......................................... 521/26
See application file for complete search history.

(56) References Cited

U.S. PATENT DOCUMENTS

| | | | |
|---|---|---|---|
| 2002/0132866 A1* | 9/2002 | Even | C08J 5/20 521/26 |
| 2010/0048445 A1 | 2/2010 | Gerusz et al. | |

(Continued)

FOREIGN PATENT DOCUMENTS

WO    2016-118576 A1    7/2016

OTHER PUBLICATIONS

Thiffault, et al., "Washing Procedure for Mixed-Bed Ion Exchange Resin Decontamination for In Situ Nutrient Adsorption," Commun. Soil Sci. Plant Anal., 31(3&4), 543-546 (2000). (Year: 2000).*

(Continued)

*Primary Examiner* — Fred M Teskin

(57) ABSTRACT

Methods of stabilizing virgin ion exchange resin material are provided. The methods include cleansing the virgin ion exchange resin material with a preparation comprising a non-ionic detergent. The methods include cleansing the virgin ion exchange resin material with a preparation comprising an alcohol solvent. The methods include rinsing virgin ion exchange resin material with deoxygenated water, the methods include introducing the cleansed/rinsed virgin ion exchange resin material into a gas impermeable vessel and hermetically sealing the vessel. The methods include introducing an oxygen scavenging material into the gas impermeable vessel, and hermetically sealing the vessel. A method of facilitating water treatment in a site in need thereof by providing a cleansed virgin ion exchange resin material in deoxygenated water is also disclosed.

6 Claims, 7 Drawing Sheets

Related U.S. Application Data

(60) Provisional application No. 62/629,267, filed on Feb. 12, 2018.

(51) Int. Cl.
*B01J 49/53* (2017.01)
*C02F 1/42* (2023.01)

(56) References Cited

U.S. PATENT DOCUMENTS

2011/0152578 A1* 6/2011 Stahlbush ............... C07C 39/16
                                                              502/159
2018/0050337 A1* 2/2018 Buckner .................. B01J 39/18

OTHER PUBLICATIONS

Kilaes, Daphne, "Communication pursuant to Article 94(3) EPC", European Patent Application No. 19751899.6, mailed Jun. 6, 2024, 3 pages.
Domb, Michal K., "Notice of Deficiencies", Israeli Patent Application No. 276369, mailed Apr. 10, 2024, 7 pages.

* cited by examiner

ANTIOXIDANT PROTECTION FOR ION EXCHANGE RESINS

FIELD OF TECHNOLOGY

Aspects and embodiments disclosed herein relate to stabilization of virgin ion exchange resin materials. More particularly, aspects and embodiments disclosed relate to methods of reducing a rate of oxidative degradation of virgin ion exchange resin materials. Aspects and embodiments disclosed relate to the handling, storage, and transportation of stabilized virgin ion exchange resin materials.

SUMMARY

In accordance with an aspect, there is provided a method of stabilizing virgin ion exchange resin material. The method may comprise cleansing the virgin ion exchange resin material with a preparation comprising a non-ionic detergent to produce a cleansed virgin ion exchange resin material. The preparation may comprise the non-ionic detergent at a concentration below the non-ionic detergent's critical micelle concentration (CMC). The method may comprise introducing the virgin ion exchange resin material into a gas impermeable vessel. The method may comprise hermetically sealing the vessel.

In some embodiments, the method may further comprise rinsing the cleansed virgin ion exchange resin material with deoxygenated water.

The non-ionic detergent may comprise at least one of ethoxylated octyl phenol, polysorbate, polyoxyethylene and a metabolite thereof.

In accordance with certain embodiments, the preparation may comprise less than about 0.125 g/L ethoxylated octyl phenol.

The method may comprise introducing the cleansed virgin ion exchange resin material into a liquid impermeable container of the gas impermeable vessel.

In another aspect, there is provided a method of stabilizing virgin ion exchange resin material. The method may comprise cleansing the virgin ion exchange resin material with a preparation comprising an alcohol solvent to produce a cleansed virgin ion exchange resin material. The method may comprise introducing the cleansed virgin ion exchange resin material into a gas impermeable vessel. The method may comprise hermetically sealing the vessel.

In some embodiments, the method may further comprise rinsing the cleansed virgin ion exchange resin material with deoxygenated water.

In accordance with certain embodiments, the alcohol solvent may comprise at least one of isopropanol, methanol, ethanol, n-butanol, isooctanol, methyl isobutyl carbinol, isoamyl alcohol, isobutyl alcohol, cyclohexanol, methyl cyclohexanol, and aqueous ammonia.

The preparation may comprise less than about 0.5% isopropanol.

In some embodiments, the method may comprise introducing the cleansed virgin ion exchange resin into a liquid impermeable container of the gas impermeable vessel.

In accordance with another aspect, there is provided a method of stabilizing virgin ion exchange resin material. The method may comprise cleansing the virgin ion exchange resin material with a preparation comprising a non-ionic detergent to produce a cleansed virgin ion exchange resin material. The preparation may include the non-ionic detergent at a concentration below the non-ionic detergent's critical micelle concentration. The method may comprise rinsing the cleansed virgin ion exchange resin material with deoxygenated water to produce a rinsed virgin ion exchange resin material.

The method may comprise rinsing the cleansed ion exchange resin material with deoxygenated water having a concentration of dissolved oxygen of less than about 10 ppb.

In some embodiments, the non-ionic detergent may comprise at least one of ethoxylated octyl phenol, polysorbate, polyoxyethylene and a metabolite thereof.

The method may further comprise introducing the rinsed virgin ion exchange resin material into a gas impermeable vessel and hermetically sealing the vessel.

In accordance with another aspect, there is provided a method of stabilizing virgin ion exchange resin material. The method may comprise cleansing the virgin ion exchange resin material with a preparation comprising an alcohol solvent to produce a cleansed virgin ion exchange resin material. The method may comprise rinsing the cleansed virgin ion exchange resin material with deoxygenated water to produce a rinsed virgin ion exchange resin material.

In some embodiments, the method may comprise rinsing the cleansed ion exchange resin material with deoxygenated water having a concentration of dissolved oxygen of less than about 10 ppb.

The alcohol solvent may comprise at least one of isopropanol, methanol, ethanol, n-butanol, isooctanol, methyl isobutyl carbinol, isoamyl alcohol, isobutyl alcohol, cyclohexanol, methyl cyclohexanol, and aqueous ammonia.

The method may further comprise introducing the rinsed virgin ion exchange resin material into a gas impermeable vessel and hermetically sealing the vessel.

In accordance with another aspect, there is provided a method of facilitating water treatment at a site in need thereof. The method may comprise providing a cleansed virgin ion exchange resin material in deoxygenated water. The cleansed virgin ion exchange resin material may be a polystyrene-based ion exchange resin material. The cleansed virgin ion exchange resin material may have less than about 25 ppb oxygenated total organic carbon species.

In some embodiments, the method may further comprise providing the cleansed virgin ion exchange resin material and deoxygenated water in a liquid impermeable compartment of a hermetically sealed gas impermeable vessel.

The method may further comprise providing an oxygen scavenging material positioned between an exterior wall of the liquid impermeable compartment and an interior wall of the gas impermeable vessel.

In some embodiments, the method may further comprise providing an indicator of oxygen contamination.

The method may comprise providing the deoxygenated water in an amount between about 40% and about 50% of the cleansed virgin ion exchange resin material.

The method may comprise providing the deoxygenated water having less than about 10 ppb dissolved oxygen.

BRIEF DESCRIPTION OF THE DRAWINGS

The accompanying drawings are not intended to be drawn to scale. In the drawings, each identical or nearly identical component that is illustrated in various FIGURES is represented by a like numeral. For purposes of clarity, not every component may be labeled in every drawing. In the drawings.

DETAILED DESCRIPTION

Figure 1:
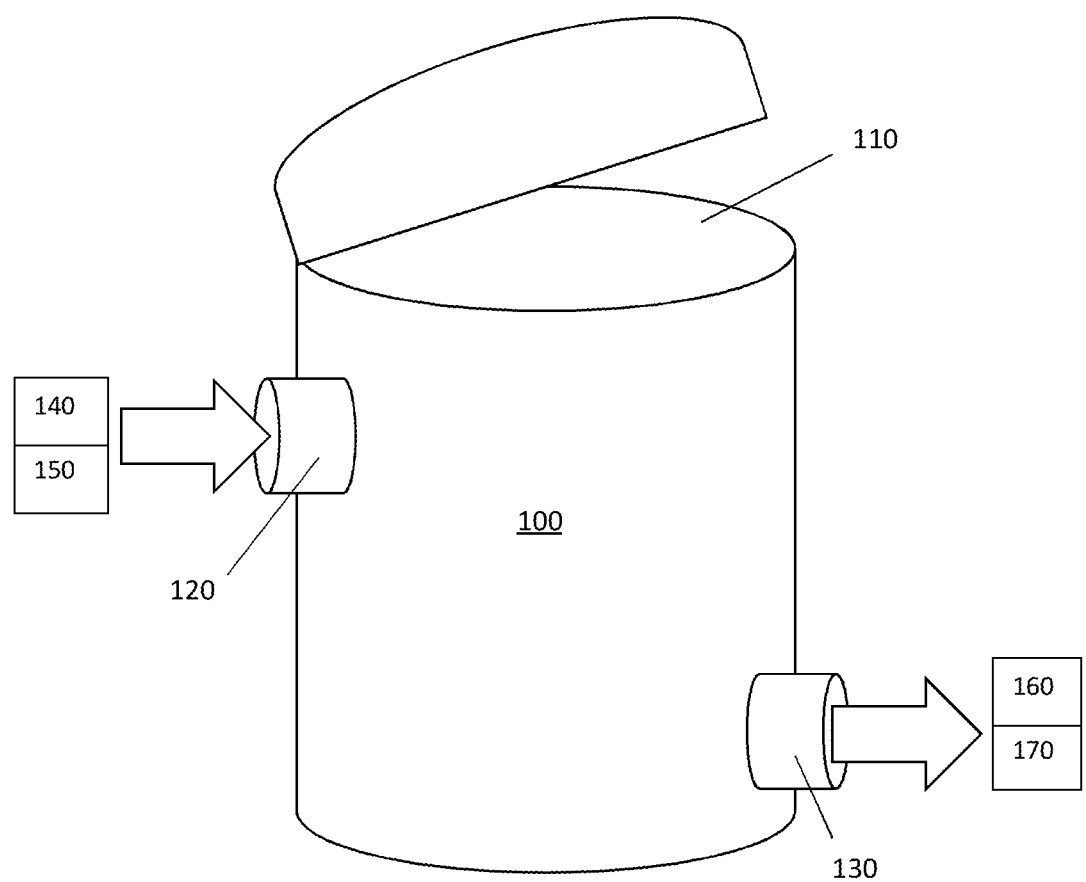
FIG. 1 is a schematic drawing of a vessel, according to an embodiment disclosed herein.

Ion exchange resins may generally be employed to separate components contained in liquid mixtures. Conventional ion exchange resins may be prepared by functionalizing a copolymer matrix with groups having cationic and anionic sites. The anions or cations may be capable of being exchanged for, or associated with, ions or molecules in the liquid having the same charge when the resin is in contact with the liquid mixture. The ions are exchanged stoichiometrically, maintaining electroneutrality of the system. A resin that exchanges one positive ion (or a proportionate quantity based on valency), such as hydrogen, for another positive ion, such as copper, iron, or sodium, is a cation resin. A resin that exchanges one negative ion (or a proportionate quantity based on valency), such as hydroxide, for another negative ion, such as chloride, sulfate, or chromate, is an anion resin. In many cases, both types of resins are used to remove various salts, such as sodium chloride or calcium sulfate, from solution. A mixed bed ion exchange resin includes a combination of cation resin and anion resin to provide a higher purity of treated water. The resin may be used until it becomes saturated with the ions being removed. Many resins may also be regenerated and reused. For example, resins used in water treatment may be regenerated by using strong acids (for cation resins) or strong bases (for anion resins).

Ion exchange is often used in water treatment, where ions in aqueous solution typically displace hydrogen ($H^+$) or hydroxide ($OH^-$) ions bound to a substrate, for example, an ion exchange resin. This is sometimes known as "water demineralization" or "water deionization." Ion exchange resins may generally be used in the fields of, for example, water purification, nuclear power generation, microelectronics manufacturing, semiconductor manufacturing, food processing, pharmaceutical manufacturing, chemical processing, and metal extraction.

Under certain conditions, ion exchange resins may experience oxidative degradation of the copolymer matrix over an extended period of time. Liquid mixtures that are placed in contact with the resin, for example, during purification of the liquid mixture, may contain quantities of oxidizing species such as molecular oxygen, dissolved oxygen, dissolved chlorine, or may have an elevated temperature. Each of these may promote undesired degradation of the copolymer matrix. In some instances, ion exchange resins may experience oxidative degradation during handling, storage, or transportation prior to use. For example, water or air that is in contact with ion exchange resins prior to use may also promote degradation of the copolymer matrix.

Specifically, it is believed that during oxidative degradation, carbon-carbon bonds rupture, breaking cross-links between individual polymer chains and/or links between individual styrene moieties. As used herein, "oxidative degradation" of an ion exchange resin material refers to the loss of carbon-carbon bonds of the cross-links between individual polymer chains or styrene moieties of the material's copolymer matrix. While not wishing to be bound by any particular theory, it is believed that the loss of such bonds may cause an increase in water retention capacity and, ultimately, in the release of organic contaminants, such as segments of functionalized linear polystyrene. Oxidative degradation of the copolymer matrix may be undesirable for commercial operation of an ion exchange or chromatographic process. For example, resins which lose cross-links may become relatively soft and swell to a greater extent. Resin softness and increased swelling as a result of oxidative degradation may ultimately cause one or more of an increased bed pressure drop, a reduced flow rate for the liquid mixture being treated, and a reduced operating capacity for removing chemical species from liquids to be treated.

Additionally, the loss of cross-links in the copolymer matrix may increase the release of organic contaminants into column effluent which can be unacceptable in some applications, such as in the nuclear power generation industry. Organic contaminants, for example, from degraded ion exchange resin, may create a source of potential corrosion to process equipment or foul other ion exchange resins associated with a process. Ionic contaminants can also arise from degraded ion exchange resin. For instance, in an exemplary treatment process, cation exchange resin may contain a fixed sulfonic acid charge on a styrene backbone. The sulfonic acid is negatively charged. A positively charged ion, such as sodium or calcium, can be exchanged with another ion from the ion exchange resin, for example a hydrogen ion ($H+$), such that the sodium or calcium is removed from the liquid being treated. However, in some instances, the resin can degrade to an extent that sulfate ions leach from the cation exchange resin. The leaching sulfate ions can have a detrimental effect on the quality of the treated water.

Previously, those in industry attempted to remedy oxidative degradation of ion exchange resin and its associated problems by increasing the amount of cross-linking monomer used in preparing the copolymer matrix. However, an increase in the number of cross-links generally rendered the resulting resin bead less compatible with liquid mixtures, thereby resulting in reduced diffusion into the bead and poor operating capacity. A highly cross-linked resin may also exhibit poor regeneration efficiency and may be impermeable with respect to large molecules, such as glucose, fructose, and other sugars. Furthermore, increasing the cross-link density may not address problems associated with release of organic contaminants, since degradation still occurs.

Others in industry attempted to remedy oxidative degradation of ion exchange resin by substituting a halogen for a hydrogen at a tertiary carbon adjacent to a benzene ring of a styrene moiety. Briefly, as postulated in U.S. Pat. No. 3,342,755, incorporated herein by reference in its entirety for all purposes, a possible mechanism for degradation of the copolymer matrix is related to a "weak link" identified at a tertiary carbon adjacent to the benzene ring of a styrene moiety. The tertiary carbon is deemed a weak link due to the tendency of its attached hydrogen to form hydroperoxide with oxidizing agents like molecular oxygen or chlorine. The hydroperoxides may eventually lead to splitting of carbon chains associated with the copolymer. In the '755 patent, the inventors attempted to remedy the degradation by employing a monomer such as ortho-chlorostyrene, that does not contribute to resin stability.

When degradation of ion exchange resin does occur, conventionally, an attempt may be made to rinse degradation products from the ion exchange resin unless resin performance has been compromised. When rinsed with standard rinse water (non-deoxygenated water) the ion exchange resin may continue to experience oxidative degradation and/or contamination. Residual polymer fragments and impurities during polymerization and activation steps in the manufacturing of ion exchange resin are entangled and will slowly leach from the resins. These also must be rinsed out to an acceptable level in certain industrial applications. Furthermore, in certain instances, rinsing the ion exchange resin generates a large volume of waste. For example, in the nuclear industry, rinsing the ion exchange resin may generate a large volume or radioactive waste water that is complicated to dispose of. There exists a need for stabilization of virgin ion exchange resin while it remains offline, prior to use.

Ion exchange resin may be stabilized, and oxidative degradation of the ion exchange resin may be prevented by limiting exposure of the resin to oxidants such as molecular oxygen, dissolved oxygen, or chlorine. Conventionally, before being used to treat a liquid, ion exchange resins are often stored in vessels comprising moisture. The present inventors recognized that ion exchange resin may be stabilized prior to use by preventing exposure of the ion exchange resin to oxygen and/or chlorine dissolved in the standard rinse water and limiting a rate of oxidative degradation of the resin. Furthermore, conventional ion exchange resin storage vessels may generally allow ingress of air into the vessel, causing a rapid rate of oxidative degradation of the ion exchange resin. The present inventors have recognized that ion exchange resin may further be stabilized by preventing contact with oxygen, for example, from ambient air, further limiting oxidative degradation of the ion exchange resin. Stabilization may allow the ion exchange resin to remain viable while offline for a predetermined period of time as compared to ion exchange resin that is conventionally stored prior to use. Methods disclosed herein may also reduce a volume of waste water that is generated during rinsing.

An analysis was performed on polystyrene-based resin to determine the identity of some contaminants released by oxidative degradation of the resin. Some of the contaminants identified included 5-methyl-3-hexanone, methoxyphenyloxime, benzaldehyde, acetophenone, 2-methylbenzaldehyde, benzenemethanimine, and tributylamine. While not wishing to be bound by any particular theory, it is believed that at least some of these contaminants are generated from the oxidation of styrene and ortho-xylene moieties present from the manufacture of the resin.

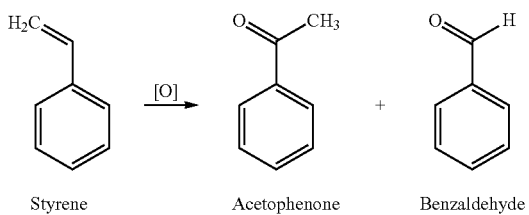

Styrene   Acetophenone   Benzaldehyde

-continued

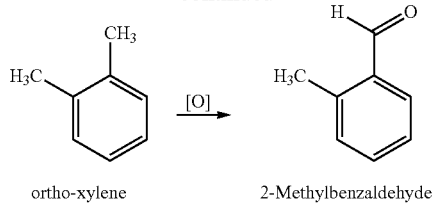

ortho-xylene    2-Methylbenzaldehyde

Such contaminants may have varying degrees of water solubility. For instance, acetophenone, benzaldehyde, and 2-methylbenzaldehyde have water solubilities of 5.5 g/L, 3.0 g/L, and 1.2 g/L, respectively. The contaminants with high water solubility may generally rinse off with water. However, contaminants with a lower water solubility may not rinse off with water or may only partially rinse off with water.

Aspects and embodiments disclosed herein relate to stabilization of virgin ion exchange resin material. In some embodiments, stabilization of the ion exchange resin may refer to maintaining stability of the ion exchange resin over time, for example during handling, storage, and/or transportation. Stabilization and maintained stability may relate to a reduction in the rate of oxidative degradation of the virgin ion exchange resin material. Specifically, as used herein, "stabilized" ion exchange resin material may refer to ion exchange resin material having a reduced rate of oxidative degradation over a predetermined period of time.

Systems and methods of stabilizing virgin ion exchange resin material are disclosed. Methods of stabilizing ion exchange resin may comprise rinsing virgin ion exchange resin material with deoxygenated water to produce a rinsed virgin ion exchange resin material. Methods of stabilizing ion exchange resin may comprise introducing the rinsed virgin ion exchange resin material into a gas impermeable vessel. Methods of stabilizing virgin ion exchange resin material may comprise hermetically sealing the gas impermeable vessel.

In some embodiments, methods of stabilizing ion exchange resin may comprise rinsing virgin ion exchange resin material with deoxygenated water having a concentration of dissolved oxygen of less than about 10 ppb. Methods of stabilizing ion exchange resin may comprise rinsing virgin ion exchange resin material with deoxygenated water having a concentration of dissolved oxygen of about 1 ppb. Methods of stabilizing ion exchange resin may comprise rinsing virgin ion exchange resin material with deoxygenated water having a concentration of chlorine of less than about 10 ppb. Methods of stabilizing ion exchange resin may comprise rinsing virgin ion exchange resin material with deoxygenated water having a concentration of chlorine of about 1 ppb.

In certain embodiments, methods disclosed herein may comprise rinsing virgin ion exchange resin material by introducing deoxygenated water into the gas impermeable vessel with the virgin ion exchange resin material, and removing interstitial deoxygenated water from the vessel. Rinsing with non-deoxygenated deionized water may be an improvement over not rinsing immediately prior to usage of water at customer sites. A pre-rinse may be designed to remove residual polymers and organic compound fragments entangled in resins. The deoxygenation of deionized water may minimize the incidence of oxygen in deionized rinse water breaking down the resin itself, which may generally contribute to the organic (as measured by Total Organic Carbon—TOC) impurity level coming from ion exchange resins.

In some embodiments, methods disclosed herein may comprise maintaining a moisture content in the rinsed virgin ion exchange resin material. Maintaining a moisture content may be related to polymer cross-linkage required for resin function, minimizing leaching of organic compounds, and increasing physical strength. For instance, in some embodiments, methods may comprise maintaining at least about 40% moisture content in the rinsed virgin ion exchange resin material. In some embodiments, methods may comprise maintaining about 50% moisture content in the rinsed virgin ion exchange resin material. In some embodiments, methods may comprise maintaining between about 40% and about 50% moisture content in the rinsed virgin ion exchange resin material.

In accordance with certain embodiments, methods disclosed herein may further comprise producing deoxygenated water. For instance, the deoxygenated water may be produced by deoxygenating non-deoxygenated water. The non-deoxygenated water may be deoxygenated by treating to remove dissolved oxygen. In some embodiments, the non-deoxygenated water may be deoxygenated by passing through a deoxygenation membrane. In some embodiments, the non-deoxygenated water may be deoxygenated by subjecting non-deoxygenated water to vacuum degasification.

In some embodiments, methods disclosed herein may comprise rinsing the virgin ion exchange resin material with deoxygenated water having a concentration of dissolved oxygen effective to reduce a rate of oxidative degradation of the virgin ion exchange resin material. For instance, the rate of oxidative degradation may be reduced such that a first volume of water treated by the virgin ion exchange resin material comprises less than about 10 ppb total organic carbon. In some embodiments, the rate of oxidative degradation may be reduced such that the first volume of water treated by the virgin ion exchange resin material comprises less than about 10 ppb total organic carbon after maintaining the virgin ion exchange resin material in the vessel for a predetermined period of time.

In some embodiments, the rate of oxidative degradation may be reduced such that a first volume of water treated by the virgin ion exchange resin material comprises less than about 10 ppb sulfate. In some embodiments, the rate of oxidative degradation may be reduced such that a first volume of water treated by the virgin ion exchange resin material comprises less than about 10 ppb chloride. The rate of oxidative degradation may be reduced such that the first volume of water treated by the virgin ion exchange resin material comprises less than about 10 ppb sulfate and/or less than about 10 ppb chloride after maintaining the virgin ion exchange resin material in the vessel for a predetermined period of time. Organically bound chloride and sulfates are typically measured collectively as TOC. Individual organic sulfates and organic chlorides in virgin untreated resin may break down to form ionic chlorides and sulfates. These compounds may be measured analytically by UV light, which breaks down the organic compound, leaving ionic chlorides and sulfates which may be analyzed using traditional methods.

In some embodiments, the rate of oxidative degradation may be reduced such that the first volume of water treated by the virgin ion exchange resin material comprises less than about 10 ppb total organic carbon, less than about 10 ppb sulfate, and/or less than about 10 ppb chloride after maintaining the virgin ion exchange resin material in the vessel for at least about six months.

In some embodiments, methods disclosed herein may further comprise unsealing the vessel and rinsing the virgin ion exchange resin material. The method may further comprise unsealing the vessel and rinsing the virgin ion exchange resin material after maintaining the virgin ion exchange resin material in the vessel for a predetermined period of time. For instance, the method may further comprise unsealing the vessel and rinsing the virgin ion exchange resin material after maintaining the virgin ion exchange resin material in the vessel for at least about six months. The method may further comprise unsealing the vessel and rinsing the virgin ion exchange resin material with deoxygenated water and/or deionized water (deoxygenated or non-deoxygenated) prior to use.

In accordance with another aspect, there are provided methods of facilitating water treatment at a site in need thereof. The methods of facilitating water treatment at a site may comprise rinsing virgin ion exchange resin material with deoxygenated water to produce a rinsed virgin ion exchange resin material. The methods of facilitating water treatment may comprise introducing the rinsed virgin ion exchange resin material into a gas impermeable vessel. The methods may comprise hermetically sealing the vessel. In some embodiments, the methods may comprise providing the gas impermeable vessel comprising the rinsed virgin ion exchange resin material and residual moisture to the site, for example, to the water treatment site. The residual moisture content may comprise, for example, between about 40% and about 50% moisture content.

In some embodiments, methods of facilitating water treatment at a site in need thereof may comprise rinsing virgin ion exchange resin material with deoxygenated water having a concentration of dissolved oxygen of less than about 10 ppb. The methods of facilitating water treatment may comprise rinsing virgin ion exchange resin material with deoxygenated water having a concentration of dissolved oxygen of about 1 ppb. The methods of facilitating water treatment may comprise rinsing virgin ion exchange resin material with deoxygenated water having a concentration of chlorine of less than about 10 ppb. The methods of facilitating water treatment may comprise rinsing virgin ion exchange resin material with deoxygenated water having a concentration of chlorine of about 1 ppb.

In accordance with certain embodiments, methods disclosed herein may further comprise providing instructions. Methods may comprise providing instructions to maintain the virgin ion exchange resin material in the hermetically sealed vessel for a predetermined period of time. For example, methods may comprise providing instructions to maintain the virgin ion exchange resin material in the hermetically sealed vessel until it is ready to be used. In some embodiments, methods may further comprise providing instructions to unseal the vessel and rinse the virgin ion exchange resin material with deoxygenated water, for example, prior to use. Methods may comprise providing instructions to unseal the vessel and rinse the virgin ion exchange resin material prior to use in, for example, water treatment.

In accordance with another aspect, there is provided a vessel comprising virgin ion exchange resin material and deoxygenated water. In some embodiments, the vessel may be hermetically sealed. In some embodiments, the vessel may comprise deoxygenated water having less than about 10 ppb dissolved oxygen. The vessel may comprise deoxygenated water having less than about 10 ppb chlorine.

In some embodiments, the vessel may comprise a packaged desiccant media. For example, the vessel may comprise a packaged desiccant media within the vessel. In some embodiments, the vessel may be constructed from a gas impermeable material. For instance, the vessel may be constructed from at least one of stainless steel and epoxy-lined carbon steel.

In some embodiments, the virgin ion exchange resin material may be cation exchange resin. In some embodiments, the virgin ion exchange resin material may be anion exchange resin or mixed cation exchange resin and anion exchange resin.

In accordance with an aspect, there is provided a method of stabilizing virgin ion exchange resin material. The method comprises rinsing the virgin ion exchange resin material with deoxygenated water to produce a rinsed virgin ion exchange resin material. The method may further comprise introducing the rinsed virgin ion exchange resin material into a gas impermeable vessel. The method may comprise introducing the rinsed virgin ion exchange resin material into a designated compartment of the vessel, for example, into a liquid impermeable compartment. The method may comprise introducing a preservative, an oxygen scavenging material, and/or an indicator of oxygen contamination into the gas impermeable vessel. The method may further comprise hermetically sealing the vessel. The method may further comprise purging the gas impermeable vessel of oxygen. In certain embodiments, the method may comprise removing the preservative, oxygen scavenging material, and indicator of oxygen contamination prior to use of the ion exchange resin.

Systems and methods of stabilizing virgin ion exchange resin material are disclosed. The methods may comprise rinsing the virgin ion exchange resin material with deoxygenated water to produce a rinsed virgin ion exchange resin material. The methods may comprise introducing the rinsed virgin ion exchange resin material into a liquid impermeable compartment of a gas impermeable vessel. The methods may comprise hermetically sealing the vessel.

In accordance with certain embodiments, the methods may further comprise introducing an oxygen scavenging material into the gas impermeable vessel. The methods may comprise positioning the oxygen scavenging material between an exterior wall of the liquid impermeable compartment and an interior wall of the gas impermeable vessel.

In some embodiments, the methods may comprise introducing the rinsed virgin ion exchange resin material into the gas impermeable vessel comprising at least one of polyethylene terephthalate, stainless steel, and epoxy-lined carbon steel.

The methods may comprise rinsing the virgin ion exchange resin material with deoxygenated water having a concentration of dissolved oxygen of less than about 10 ppb.

The methods may comprise rinsing the virgin ion exchange resin material in the gas impermeable vessel.

In accordance with another aspect, there is provided a method of stabilizing virgin ion exchange resin material. The methods may comprise rinsing the virgin ion exchange resin material with deoxygenated water to produce a rinsed virgin ion exchange resin material. The methods may comprise introducing the rinsed virgin ion exchange resin material into a gas impermeable vessel. The methods may comprise introducing an oxygen scavenging material into the gas impermeable vessel, the oxygen scavenging material being positioned such that it does not come into direct contact with moisture. The methods may comprise hermetically sealing the vessel.

In some embodiments, the methods may further comprise introducing the rinsed virgin ion exchange resin material into a liquid impermeable compartment of the gas impermeable vessel. The methods may comprise positioning the oxygen scavenging material between an exterior wall of the liquid impermeable compartment and an interior wall of the gas impermeable vessel.

In accordance with certain embodiments, the oxygen scavenging material may comprise a ferrous compound, catechol, ascorbate, ascorbic acid, sodium hydrogen carbonate, citrus extract, an oxidative enzyme, an unsaturated hydrocarbon, a polyamide, or combinations thereof.

The methods may further comprise introducing an indicator of oxygen contamination. The indicator of oxygen contamination may be a visual indicator having a redox midpoint potential $E^0$ between about −0.05 V and about +0.06 V at pH 7 and 25° C.

In accordance with another aspect, there is provided a method of facilitating water treatment at a site in need thereof. The methods may comprise providing a rinsed virgin ion exchange resin material in deoxygenated water, the rinsed virgin ion exchange resin material positioned in a liquid impermeable compartment of a hermetically sealed gas impermeable vessel.

In some embodiments, the methods may further comprise providing an oxygen scavenging material in the gas impermeable vessel, positioned such that it does not come into direct contact with the deoxygenated water. The methods may comprise providing the oxygen scavenging material positioned between an exterior wall of the liquid impermeable compartment and an interior wall of the gas impermeable vessel. The methods may comprise providing the oxygen scavenging material selected from a ferrous compound, catechol, ascorbate, ascorbic acid, sodium hydrogen carbonate, citrus extract, an oxidative enzyme, an unsaturated hydrocarbon, a polyamide, and combinations thereof.

In some embodiments, the methods may comprise providing the deoxygenated water in an amount between about 40% and about 50% of the virgin ion exchange resin material.

The methods may comprise providing the deoxygenated water having less than about 10 ppb dissolved oxygen.

In some embodiments, the methods may comprise providing an indicator of oxygen contamination in the gas impermeable vessel.

In accordance with another aspect, there is provided a hermetically sealed vessel. The vessel may comprise virgin ion exchange resin material in deoxygenated water having less than about 10 ppb dissolved oxygen. The vessel may also comprise an oxygen scavenging material.

In some embodiments, the virgin ion exchange resin material in the deoxygenated water may be positioned in a liquid impermeable compartment of the hermetically sealed vessel.

The oxygen scavenging material may be positioned between an exterior wall of the liquid impermeable compartment and an interior wall of the vessel. The oxygen scavenging material may comprise a ferrous compound, catechol, ascorbate, ascorbic acid, sodium hydrogen carbonate, citrus extract, an oxidative enzyme, an unsaturated hydrocarbon, a polyamide, and combinations thereof.

The vessel may be constructed from a material comprising at least one of polyethylene terephthalate, stainless steel, and epoxy-lined carbon steel.

The vessel may further comprise an indicator of oxygen contamination. The indicator of oxygen contamination may comprise a visual indicator having a redox midpoint potential $E^0$ between about −0.05 V and +0.06 V at pH 7 and 25° C.

As used herein, "virgin ion exchange resin" material may refer to unused or unspent ion exchange resin material. Virgin ion exchange resin material may include newly manufactured resin and/or used resin that has been processed to meet required specifications for new use. For instance, raw or unrefined resin may be processed for new use by treating with high purity water. Used resin may also be regenerated for reuse by treating with strong acids or strong bases. Virgin ion exchange resin material may include cation exchange resin, anion exchange resin, and mixed cation exchange resin and anion exchange resin.

In accordance with yet another aspect, there are provided systems and methods for stabilizing virgin ion exchange resin material, including cleansing the virgin ion exchange resin material. The virgin ion exchange resin material may be cleansed with a preparation comprising an appropriate cleanser.

As used herein, "cleansed ion exchange resin" material may refer to ion exchange resin material which has been treated for removal of non-water soluble oxygenated impurities. In accordance with certain embodiments, the non-water soluble oxygenated impurities may be those oxidative degradation contaminants having a water solubility of less than about 10.0 g/L. The non-water soluble oxygenated impurities may have a water solubility of less than about 7.0 g/L, less than about 5.0 g/L, less than about 4.0 g/L, less than about 3.0 g/L, less than about 2.0 g/L, less than about 1.0 g/L, or less than about 0.5 g/L.

Cleansed ion exchange resin may have a concentration of oxygenated impurities or contaminants of less than about 50 ppb, which can be measured as oxygenated total organic carbon (TOC). In some embodiments, cleansed ion exchange resin may have less than 40 ppb oxygenated TOC, less than 30 ppb oxygenated TOC, less than 25 ppb oxygenated TOC, less than 20 ppb oxygenated TOC, less than 15 ppb oxygenated TOC, less than 10 ppb oxygenated TOC, or less than 5 ppb oxygenated TOC. The concentration of oxygenated TOC in the ion exchange resin may generally depend on the particular cleanser, cleanser concentration in the preparation, and method of cleansing employed.

The non-water soluble oxygenated impurities may generally be an oxygenated derivative molecule of the resin material. In accordance with certain embodiments, the ion exchange resin material may be a polystyrene based resin material. Exemplary oxygenated derivative molecules of a polystyrene based resin material include benzaldehyde and acetophenone. Other derivative molecules may result from oxidative degradation of polystyrene or other material resins. Such oxygenated molecules may be similarly removed by the methods disclosed herein.

In certain embodiments, the ion exchange resin material may include one or more antioxidant from manufacture. For instance, a polystyrene based resin may include ortho-xylene. Exemplary oxygenated derivative molecules of such antioxidants include 5-methyl-3-hexanone, methoxyphenyloxime, 2-methylbenzaldehyde, benzenemethanimine, and tributylamine. Other oxygenated derivative molecules may result from oxidative degradation of ortho-xylene or other resin molecule species. Such oxygenated molecules may be similarly removed by the methods disclosed herein.

In some embodiments, the oxygenated impurities may include one or more of 5-methyl-3-hexanone, methoxyphenyloxime, benzaldehyde, acetophenone, 2-methylbenzaldehyde, benzenemethanimine, and tributylamine.

Water soluble oxygenated impurities and contaminants may be removed by rinsing ion exchange resin material with water.

Embodiments disclosed herein may incorporate rinsing ion exchange resin material with deoxygenated water. Deoxygenated water is water that has been treated for removal of molecular oxygen, for example, of dissolved oxygen. Generally, non-deoxygenated water may comprise more than about 1 ppm molecular dissolved oxygen, and up to about 20 ppm dissolved oxygen or more. Dissolved oxygen in water may fluctuate with temperature, salinity, pH, conductivity, dissolved solids concentration, and pressure change. Dissolved oxygen concentration may be measured by one or more of meter, sensor, Winkler titration, and a colorimetric method. Embodiments disclosed herein may incorporate measuring one or more of temperature, pressure, salinity, pH, conductivity, total dissolved solids (TDS) concentration, and dissolved oxygen concentration of water.

In accordance with certain embodiments, methods disclosed herein may further comprise producing deoxygenated water. Deoxygenated water may be produced by deoxygenating non-deoxygenated water, for example, from a source of non-deoxygenated water. Deoxygenated water may be produced by treating non-deoxygenated water to remove dissolved oxygen. In some embodiments, deoxygenating non-deoxygenated water may remove at least about 75% of dissolved oxygen. Deoxygenating non-deoxygenated water may remove at least about 75%, at least about 80%, at least about 85%, at least about 90%, at least about 95%, at least about 99%, or about 100% of dissolved oxygen from the non-deoxygenated water. Deoxygenating non-deoxygenated water may remove between about 90% and about 100% of dissolved oxygen from non-deoxygenated water. Non-deoxygenated water may comprise deionized water, ultrapure water, high purity water, distilled water, microfiltered water, ultrafiltered water, water that has been subjected to reverse osmosis or ultraviolet oxidation, granular activated carbon treated water, or water that has otherwise been processed to remove contaminants.

Non-deoxygenated water may be deoxygenated by passing through a deoxygenation membrane. For instance, the deoxygenation membrane may comprise a Liqui-Cel® membrane contactor (manufactured by 3M Industrial Group, Maplewood, MN). Briefly, a deoxygenation membrane may remove dissolved gases from liquids with a mass transfer driving force. According to Henry's law, the amount of gas dissolved in a liquid at equilibrium is proportional to the gas's partial pressure in the vapor-phase in contact with the liquid. Under standard temperature and pressure (25° C. and 1 atm), at equilibrium water may comprise about 8.5 ppm dissolved oxygen, 14.5 ppm dissolved nitrogen, and some dissolved carbon dioxide. By reducing the partial pressure of a gas in contact with the liquid, the amount of gas dissolved in the liquid may be reduced correspondingly. The partial pressure of the gas may be reduced by lowering the total pressure of the gas phase or altering the concentration of the gases in the gas phase. Each of these changes may be applied to the gas side of the membrane, driving out dissolved gases from the liquid through the membrane.

Non-deoxygenated water may be deoxygenated by subjecting to vacuum degasification. Vacuum degasification may be achieved with a vacuum degasification tower or specialized vacuum chamber. To reduce a concentration of gas dissolved in a liquid with vacuum degasification, the total pressure of the gas phase may be lowered by applying a vacuum to the gas. Mass transfer may drive out dissolved gases from a liquid in contact with the gas.

Non-deoxygenated water may be deoxygenated by subjecting it to an oxygen scavenging resin. The oxygen scavenging resin may be included in a column or other device. In some embodiments, the oxygen scavenging resin may include a catalyst. The catalyst may include a metal halide. In some embodiments, the catalyst may include sodium chloride. The catalyst may include palladium or a palladium compound, for example, palladium chloride.

In some embodiments, methods disclosed herein comprise rinsing the virgin ion exchange resin material with deoxygenated water having a concentration of dissolved oxygen effective to reduce a rate of oxidative degradation of the virgin ion exchange resin material. Generally, a reduced rate of oxidative degradation may contribute to resin stability, capacity for purifying liquids, reduced rate of cross-linkage break down, reduced incidence of impurities, improved bead integrity, and/or reduced concentration of ionic contaminants in treated liquid. For instance, in some embodiments, a stabilized ion exchange resin may have between about a 90% and about a 70% reduced rate of cross-linkage break down over a predetermined storage period, for example, a storage period of at least six months. A stabilized ion exchange resin may have about a 100% reduced rate of cross-linkage break down, about a 90% reduced rate of cross-linkage break down, about an 80% reduced rate of cross-linkage break down, about a 70% reduced rate of cross-linkage break down, or about a 60% reduced rate of cross-linkage break down. The % reduction in degradation (and de-cross-linkage) may be is dependent on the concentration of oxidizer present as well as iron and other metals in or on the resin which serve as a catalyst for breakdown.

Non-water soluble oxygenated impurities and contaminants may be removed by cleansing ion exchange resin material with a surfactant. In some embodiments, non-water soluble oxygenated impurities and contaminants may be removed with a detergent, for example, a non-ionic detergent.

Embodiments disclosed herein may incorporate cleansing ion exchange resin material with a preparation comprising a non-ionic detergent. The preparation may be an aqueous preparation or may comprise a buffer or other solvent. Detergents generally include surfactants with cleaning properties, often in dilute solutions. In some embodiments, the non-ionic detergent may include a polyoxyethylene (POE), polyethylene glycol (PEG), polyethylene oxide (PEO), or glycoside backbone with uncharged, hydrophilic headgroups. Suitable non-ionic detergents include, for example, ethoxylated octyl phenol, polysorbate, polyoxyethylene and metabolites thereof.

Detergents are often foaming agents. The critical micelle concentration (CMC) of a surfactant or detergent is the concentration above which micelles form. Thus, at a concentration above the CMC a surfactant may begin to form air bubbles, which contribute to oxidative degradation of the ion exchange resin. In accordance with certain embodiments, the preparation may comprise the surfactant or detergent at a concentration below its CMC. For example, in accordance with certain embodiments, the preparation may comprise ethoxylated octyl phenol at a concentration below about 0.125 g/L. The CMC of a surfactant or detergent may vary with temperature and pressure. As disclosed herein, exemplary CMCs are for preparations at about room temperature (25° C.) and about atmospheric pressure.

Additionally or alternatively, non-water soluble oxygenated impurities and contaminants may be removed by cleansing ion exchange resin material with an alcohol solvent.

Embodiments disclosed herein may incorporate cleansing ion exchange resin material with a preparation comprising an alcohol solvent. The preparation may be an aqueous preparation or may comprise a buffer or other solvent. Alcohol solvents may be slightly polar, making them good solvents for nonpolar hydrocarbons, polar organic molecules, and certain ionic compounds. Exemplary alcohol solvents may include, for example, isopropanol, methanol, ethanol, n-butanol, isooctanol, methyl isobutyl carbinol, isoamyl alcohol, isobutyl alcohol, cyclohexanol, methyl cyclohexanol, and aqueous ammonia.

Isopropanol can be used as a solvent and cleaning agent for the ion exchange resin due to its ability to remove non-water soluble contaminants while being mostly inoffensive to the ion exchange resin. In accordance with certain embodiments, the preparation may comprise less than 2.0% isopropanol. For instance, the preparation may comprise less than about 1.5% isopropanol, less than about 1.0% isopropanol, less than about 0.5% isopropanol, or less than about 0.25% isopropanol.

In some embodiments, a stabilized ion exchange resin may comprise less than about 100 ppm metallic impurities (dry wt.), including, for example, aluminum, copper, iron, sodium, and lead, and/or less than about 10 ppm organic impurities (soak), including, for example, total organic carbon (TOC), sulfate, and chloride, after a predetermined storage period, for example, a storage period of at least six months. Specifically, a stabilized ion exchange resin may comprise less than or equal to about 50 ppm iron impurities, less than or equal to about 40 ppm, less than or equal to about 30 ppm, less than or equal to about 20 ppm, less than or equal to about 10 ppm, less than or equal to about 5 ppm, or less than or equal to about 1 ppm iron impurities. A stabilized ion exchange resin may comprise less than or equal to about 5 ppm TOC, sulfate, or chloride impurities, less than about 4 ppm, less than about 3 ppm, less than about 2 ppm, less than about 1 ppm, less than about 0.5 ppm, or less than about 0.1 ppm TOC, sulfate, or chloride impurities, less than about 1 ppb of TOC, and even less than about 0.5 ppb of TOC. These concentrations may be measured analytically, in the rinse water passing through the resin and/or soaking of the resin and measuring the TOC in the effluent water. Levels are being measured to less than 1 ppb and even less than 0.5 ppb of TOC. In some embodiments, a stabilized ion exchange resin material that has been stored for a predetermined storage period may substantially resemble, for example in bead integrity, concentration of impurities, and/or concentration of ionic contaminants in treated liquid, a new or regenerated ion exchange resin material.

Methods disclosed herein may involve a predetermined storage period. The predetermined storage period may generally include any time the ion exchange resin is kept in the hermetically sealed vessel. The storage period may include storage, handling, transportation, or any purpose for maintaining the ion exchange resin within the hermetically sealed vessel. As used herein, a predetermined storage period may include a storage period of at least about 15 days, a storage period of at least about 30 days, a storage period of at least about one month, a storage period of at least about two months, a storage period of at least about three months, a storage period of at least about six months, a storage period of at least about nine months, a storage period of at least about 12 months, a storage period of at least about 18 months, or a storage period of at least about 24 months.

In some embodiments, the rate of oxidative degradation of a virgin ion exchange resin material may be reduced such that a first volume of water treated by the virgin ion exchange resin material comprises less than about 1 ppb TOC to less than about 10 ppb TOC. In some embodiments, the rate of oxidative degradation may be reduced such that the first volume of water treated by the virgin ion exchange resin material comprises less than about 1 ppb TOC to less than about 10 ppb TOC after maintaining the virgin ion exchange resin material in the vessel for a predetermined period of time. For instance, the first volume of water treated may comprise less than about 30 ppb TOC, less than about 20 ppb TOC, less than about 10 ppb TOC, less than about 5 ppb TOC, less than about 1 ppb TOC, less than about 0.5 ppb TOC, or less than about 0.1 ppb TOC.

As disclosed herein, a first volume of water treated by ion exchange resin material includes an initial monitored soak or rinse of an ion exchange resin material, once the ion exchange resin material is placed on line to treat water. In some embodiments, the concentration of contaminants in the first volume of water treated may be measured from water that is in contact with the ion exchange resin material. In other embodiments, the concentration of contaminants in the first volume of water treated may be measured downstream from the ion exchange resin material contact, for example such that the water is diluted or concentrated in downstream processes. In some embodiments, the water may be diluted or concentrated at least about 100, about 200, or about 300 times. In such embodiments, the concentration of contaminants measured in the diluted or concentrated water may be extrapolated to determine the concentration of contaminants in non-diluted or non-concentrated first volume of treated water. Accordingly, a concentration of contaminants in the first volume of treated water, as disclosed herein, may refer to a non-diluted and non-concentrated concentration of contaminants. The first volume of treated water may comprise, for example, between about 25 gallons and about 150 gallons of treated water. In some embodiments, the non-diluted, non-concentrated first volume of treated water comprises about 25 gallons, about 50 gallons, about 75 gallons, about 100 gallons, about 125 gallons, or about 150 gallons of treated water. Alternatively, the first 15-20 resin bed volumes of rinse water passed through the ion exchange resin material may contain high ppb or low ppm levels of organics, including organic sulfates and organic chlorides.

In some embodiments, the rate of oxidative degradation may be reduced such that a first volume of water treated by the virgin ion exchange resin material comprises less than about 10 ppb sulfate. The rate of degradation while in service may be impacted by temperature, nuclear radiation, and/or oxidation and metals present on the resin. In some embodiments, the rate of oxidative degradation may be reduced such that a first volume of water treated by the virgin ion exchange resin material comprises less than about 10 ppb chloride. The rate of oxidative degradation may be reduced such that the first volume of water treated by the virgin ion exchange resin material comprises less than about 10 ppb sulfate and/or less than about 10 ppb chloride after maintaining the virgin ion exchange resin material in the vessel for a predetermined period of time. For instance, the first volume of water treated may comprise less than about 30 ppb sulfate or chloride, less than about 20 ppb sulfate or chloride, less than about 10 ppb sulfate or chloride, less than about 5 ppb sulfate or chloride, less than about 1 ppb sulfate or chloride, less than about 0.5 ppb sulfate or chloride, or less than about 0.1 ppb sulfate or chloride.

In some embodiments, the rate of oxidative degradation may be reduced such that the first volume of water treated by the virgin ion exchange resin material comprises less than about 10 ppb TOC, less than about 10 ppb sulfate, and/or less than about 10 ppb chloride after maintaining the virgin ion exchange resin material in the vessel for a predetermined storage period, for example at least about six months.

In some embodiments, the deoxygenated water may comprise less than about 0.1 ppm dissolved oxygen. For instance, deoxygenated water may comprise less than about 0.1 ppm, less than about 50 ppb, less than about 40 ppb, less than about 30 ppb, less than about 20 ppb, less than about 10 ppb, less than about 8 ppb, less than about 6 ppb, less than about 5 ppb, less than about 4 ppb, less than about 3 ppb, less than about 2 ppb, less than about 1 ppb, or less than about 0.5 ppb dissolved oxygen.

Deoxygenation may remove other dissolved gases in the water, for example, dissolved carbon dioxide, dissolved nitrogen, and other ambient air gases. In some embodiments, the deoxygenated water may comprise less than about 0.1 ppm dissolved carbon dioxide or dissolved nitrogen. For instance, deoxygenated water may comprise less than about 0.1 ppm, less than about 50 ppb, less than about 40 ppb, less than about 30 ppb, less than about 20 ppb, less than about 10 ppb, less than about 8 ppb, less than about 6 ppb, less than about 5 ppb, less than about 4 ppb, less than about 3 ppb, less than about 2 ppb, less than about 1 ppb, or less than about 0.5 ppb dissolved carbon dioxide or dissolved nitrogen.

Methods disclosed herein may comprise treating deoxygenated water or non-deoxygenated water to remove oxidizing contaminants. Deoxygenated or non-deoxygenated water may comprise low quantities of other oxidizing contaminants, for example chlorine chloramine, and/or hydrogen peroxide. Deoxygenated or non-deoxygenated water may be treated with membrane filtration, reverse osmosis, high purity reducing agents (for example, sodium bisulfite) or granulated active carbon to remove oxidizing contaminants like chlorine. In some embodiments, deoxygenated or non-deoxygenated water may comprise less than about 0.1 ppm chlorine. For instance, deoxygenated water may comprise less than about 0.1 ppm, less than about 50) ppb, less than about 40 ppb, less than about 30 ppb, less than about 20 ppb, less than about 10 ppb, less than about 8 ppb, less than about 6 ppb, less than about 5 ppb, less than about 4 ppb, less than about 3 ppb, less than about 2 ppb, less than about 1 ppb, or less than about 0.5 ppb chlorine, chloramine, and hydrogen peroxide.

Methods disclosed herein may comprise rinsing virgin ion exchange resin material by introducing deoxygenated water into the gas impermeable vessel with the virgin ion exchange resin material, and removing interstitial (oxygenated) water from the vessel. For instance, the vessel comprising virgin ion exchange resin material may be filled with deoxygenated water and substantially drained of the deoxygenated water, displacing the oxygenated water with deoxygenated water. In some embodiments, methods disclosed herein may comprise maintaining a moisture content in the rinsed virgin ion exchange resin material. As disclosed herein, moisture content may refer to the quantity of liquid or water contained in a material. Moisture content may be defined as the ratio of mass of liquid, for example water, in a sample to the mass of solids, for example, ion exchange resin, in the sample expressed as a percentage. The interstitial moisture is the water in the void space between individual resin beads. The moisture of the bead itself is the moisture or hydration within the resin bead that is measured for % moisture. Most plastics (and other materials) have an inherent amount of moisture within the material that can be dried and the difference in weight is measured. The deoxygenation portion of methods disclosed herein is displacing, and otherwise removing, both locations of oxygenated water.

In some embodiments the method comprises maintaining at least about 20% moisture content in the rinsed virgin ion exchange resin material. Methods may comprise maintaining at least about 20%, at least about 30%, at least about 40%, at least about 50%, at least about 60%, or at least about 70% moisture content in the rinsed ion exchange resin material. In some embodiments, the method comprises maintaining less than about 50% moisture content in the rinsed virgin ion exchange resin material. The method may comprise maintaining less than about 80%, less than about 70%, less than about 60%, less than about 50%, less than about 40%, or less than about 30% moisture content in the rinsed ion exchange resin material. In some embodiments, the method comprises maintaining between about 20% and about 80%, between about 30% and about 60%, or between about 40% and about 50% moisture content in the rinsed virgin ion exchange resin material. The residual moisture content may be maintained in the virgin ion exchange resin material while the vessel is sealed, for example, while the vessel comprising rinsed virgin ion exchange resin material is handled, stored, or transported. In some embodiments, the moisture content may contribute to stabilization of the rinsed virgin ion exchange resin material over time. For instance, the moisture content may contribute to a reduced rate of oxidative degradation of the virgin ion exchange resin material.

Higher cross-linkage resins may guard against the significance of oxidative degradation. The higher cross-linkage contains entangled organics resulting in some period of lower TOC levels. This effect may be nullified with continued oxidizer exposure to the resin.

In some embodiments, methods disclosed herein may further comprise unsealing the vessel and rinsing the virgin ion exchange resin material. The method may further comprise unsealing the vessel and rinsing the virgin ion exchange resin material after maintaining the virgin ion exchange resin material in the vessel for a predetermined period of time, as previously described. For instance, the method may further comprise unsealing the vessel and rinsing the virgin ion exchange resin material after maintaining the virgin ion exchange resin material in the vessel for at least about six months. The method may further comprise unsealing the vessel and rinsing the virgin ion exchange resin material prior to use. The virgin ion exchange resin material may be rinsed prior to use with deoxygenated water. In some embodiments, the virgin ion exchange resin material may be rinsed prior to use with deoxygenated water having any concentration of dissolved oxygen, dissolved gases, or oxidizing contaminants as previously disclosed herein. The virgin ion exchange resin material may be rinsed prior to use with deoxygenated water having been produced by any of the methods previously disclosed herein.

In accordance with another aspect, there is provided a method of facilitating water treatment at a site in need thereof. The site in need thereof may be related to, for example, nuclear power generation, microelectronics manufacturing, semiconductor manufacturing, food preparation, pharmaceutical manufacturing, chemical processing, and metal extraction, or any site in need of water treatment that may benefit from ion exchange water treatment technology.

The method of facilitating water treatment at a site may comprise providing a rinsed virgin ion exchange resin material in deoxygenated water, as previously described herein. The rinsed virgin ion exchange resin material may be provided in a hermetically sealed gas impermeable vessel. In some embodiments, the rinsed virgin ion exchange resin material may be provided in a liquid impermeable compartment of the hermetically sealed vessel. The method may further comprise providing one or more of a preservative, an oxygen scavenging material, or an indicator of oxygen contamination within the hermetically sealed vessel.

The method of facilitating water treatment at a site may comprise providing a cleansed virgin ion exchange resin material in deoxygenated water, as previously described herein. The cleansed virgin ion exchange resin material may be a polystyrene-based ion exchange resin material. As previously described, the polystyrene-based resin material may break down to form oxygenated impurities and contaminants in the form of total organic carbon (TOC). In some embodiments, the cleansed virgin ion exchange resin material provided may have less than about 25 ppb oxygenated TOC species. For instance, the cleansed virgin ion exchange resin material provided may have less than about 20 ppb oxygenated TOC, less than about 15 ppb oxygenated TOC, less than about 10 oxygenated ppb TOC, or less than about 5 ppb oxygenated TOC.

The cleansed virgin ion exchange resin material may be provided in a hermetically sealed gas impermeable vessel. In some embodiments, the cleansed virgin ion exchange resin material may be provided in a liquid impermeable compartment of the hermetically sealed vessel. The method may further comprise providing one or more of a preservative, an oxygen scavenging material, or an indicator of oxygen contamination within the hermetically sealed vessel. The cleansed virgin ion exchange material may have been rinsed with deoxygenated water before or after being cleansed.

Generally, the method of facilitating water treatment at a site may comprise rinsing virgin ion exchange resin material with deoxygenated water to produce a rinsed virgin ion exchange resin material. Additionally or alternatively, the method may comprise cleansing the virgin ion exchange resin material with a surfactant, detergent, or alcohol solvent. The method may comprise introducing the virgin ion exchange resin material into a gas impermeable vessel, hermetically sealing the vessel, and purging the vessel of oxygen, as previously described herein. The method of facilitating water treatment may comprise providing the gas impermeable vessel comprising the rinsed and/or cleansed virgin ion exchange resin material and residual moisture to the site, for example, to the water treatment site. In some embodiments, the method of facilitating water treatment may further comprise providing instructions for use of the vessel comprising virgin ion exchange resin material.

Residual moisture content may comprise maintaining a percentage of moisture content in the rinsed ion exchange resin, as previously described. For example, residual moisture content may comprise between about 40% and about 50% moisture content. Residual moisture content may comprise between about 20% and about 80%, between about 30% and about 60%, or between about 40% and about 50% moisture content in the rinsed virgin ion exchange resin material, or any amount of moisture content as previously described.

In some embodiments, the method of facilitating water treatment at a site in need thereof may comprise rinsing virgin ion exchange resin material with deoxygenated water, for example, having a concentration of dissolved oxygen of less than about 10 ppb. In some embodiments, the virgin ion exchange resin material may be rinsed with deoxygenated water having any concentration of dissolved oxygen, dissolved gases, or oxidizing contaminants as previously disclosed herein.

In some embodiments, the method of facilitating water treatment at a site in need thereof may comprise cleansing virgin ion exchange resin material with a preparation, for example, having a concentration of non-ionic detergent less than its CMC. For instance, the method may comprise cleansing virgin ion exchange resin material with a preparation having a concentration of less than about 0.125 g/L ethoxylated octyl phenol. In some embodiments, the method may comprise cleansing virgin ion exchange resin material with a preparation, for example, comprising an alcohol solvent. For instance, the method may comprise cleansing virgin ion exchange resin material with a preparation have a concentration of less than about 0.5% isopropanol. In some embodiments, the virgin ion exchange resin material may be cleansed with a preparation having any concentration of surfactant, detergent, or alcohol solvent as previously disclosed herein.

In accordance with certain embodiments, methods disclosed herein may further comprise providing instructions. Methods may comprise providing instructions to maintain the virgin ion exchange resin material in the hermetically sealed vessel for a predetermined period of time. For example, methods may comprise providing instructions to maintain the virgin ion exchange resin material in the hermetically sealed vessel until it is ready to be used. The predetermined period of time may include any amount of storage, handling, and/or transportation time required before use of the ion exchange resin. The predetermined period of time may include any predetermined period of time as previously described herein.

Methods disclosed herein may comprise providing instructions to maintain the hermetically sealed vessel under certain conditions. For instance, methods may comprise providing instructions to maintain a vessel comprising cation exchange resin at a temperature of below at least about 210° F. (99° C.), below at least about 200° F. (93° C.), or below at least about 190° F. (88° C.). Methods may comprise providing instructions to maintain a vessel comprising anion exchange resin or mixed anion and cation exchange resin at a temperature of below at least about 130° F. (54° C.) or below at least about 120° F. (49)° ° C. and down to ambient temperatures. Methods may comprise providing instructions to maintain the hermetically sealed vessel at ambient pressure. Methods may comprise providing instructions to refrain from increasing temperature by more than 10° C., for example, by more than 7° C. or by more than 5° C.

In some embodiments, methods may further comprise providing instructions to unseal the vessel and rinse the virgin ion exchange resin material with deoxygenated water, for example, prior to use. The virgin ion exchange resin material may be rinsed with deoxygenated water having any concentration of dissolved oxygen, dissolved gases, or oxidizing contaminants as previously described herein. The methods disclosed herein may comprise instructions to rinse the virgin ion exchange resin material immediately prior to use. In some embodiments, the methods may comprise providing instructions to rinse the virgin ion exchange resin material immediately prior to use while the ion exchange resin is still contained within the vessel. For example, the methods may include providing instructions to fill the vessel with deoxygenated water and remove interstitial water from the vessel, thus rinsing the virgin ion exchange resin material. Methods may comprise providing instructions to unseal the vessel and rinse the virgin ion exchange resin material prior to use in, for example, water treatment.

In some embodiments, the method of facilitating water treatment may comprise instructions to return the vessel after removal of the ion exchange resin material. Such instructions may reduce waste of the vessel and reduce operator time.

In accordance with another aspect, there is provided a vessel comprising virgin ion exchange resin material and deoxygenated water. In some embodiments, the vessel may be hermetically sealed. The vessel may comprise an opening with a hermetic seal. The vessel may further comprise an inlet and an outlet. The inlet and outlet may comprise a hermetic seal. The inlet may be connected to a source of ion exchange resin material or a source of deoxygenated water. The outlet may be connected to a drain for deoxygenated water or a point of use for the ion exchange resin material. For instance, the outlet may be connected to a hose configured to deliver the ion exchange resin material to a point of use.

The vessel may be a container, tank, barrel, basin, chamber, or receptacle configured to hold ion exchange resin and deoxygenated water. The vessel may generally have a volume of between about 20 cubic feet (0.57 m$^3$) and about 50 cubic feet (1.42 m$^3$). For example, the vessel may have a volume of about 20 cubic feet (0.57 m$^3$), 25 cubic feet (0.71 m$^3$), 30 cubic feet (0.85 m$^3$), 35 cubic feet (1.0 m$^3$), 40 cubic feet (1.13 m$^3$), 45 cubic feet (1.27 m$^3$), or 50 cubic feet (1.42 m$^3$). The vessel may generally have a volume that is capable of observing overhead restrictions associated with a site in need of ion exchange resin material.

In some embodiments, the vessel may be constructed from a gas impermeable material. The vessel may be constructed from a material with a high flash point. For instance, the vessel may be constructed from or lined with at least one of stainless steel and epoxy-lined carbon steel. The vessel may be constructed from or lined with polyethylene terephthalate. Conventionally, ion exchange resin storage and transportation vessels may be constructed from fiber, plastic, or wood. Such materials, although relatively inexpensive, are not gas impermeable and may contribute to oxidative degradation of ion exchange resin material within the vessel. Furthermore, conventional materials may have a low flash point, which may be unsafe and/or undesirable at certain sites in need of ion exchange resin material.

The vessel may comprise one or more compartments. In accordance with certain embodiments, the vessel may comprise a liquid impermeable compartment. The virgin ion exchange resin and deoxygenated water may be packaged in the liquid impermeable compartment. The liquid impermeable compartment may comprise substantially no headspace or interstitial space between the resin beads and water content. In some embodiments, the liquid impermeable compartment may comprise between about 40% and about 50% moisture content in the form of deoxygenated water. In some embodiments, the liquid impermeable compartment may also be gas impermeable. The liquid impermeable compartment may be constructed from the gas impermeable materials described above. Alternatively, the liquid impermeable compartment may be constructed from a polymeric material or a metal material which is liquid impermeable. In some embodiments, the one or more compartments are integral to the vessel. In other embodiments, the one or more compartments are removable from the vessel. For instance, the liquid impermeable compartment containing the ion exchange resin may be an ion exchange resin packaging which is removable from the vessel.

In some embodiments, the vessel may comprise deoxygenated water having any concentration of dissolved oxygen, dissolved gases, or oxidizing contaminants as previously described herein. In some embodiments, the vessel may comprise an interstitial volume of deoxygenated water. In some embodiments, the vessel may comprise deoxygenated water as residual moisture, for example, as moisture content previously described herein.

The vessel or a compartment thereof may comprise a predetermined volume of void space, for example, the vessel or compartment may comprise interstitial void space between ion exchange resin beads and/or a headspace. In some embodiments, the void space is limited. The vessel or compartment may comprise substantially no headspace and/or limited interstitial space between resin beads. Limiting the void space may contribute to stability of the ion exchange resin stored, handled, or transported within the vessel.

In some embodiments, the vessel may comprise a preservative. The vessel may comprise a packaged desiccant media. For example, the vessel may comprise a packaged desiccant media contained within the vessel. The packaged desiccant media may be configured to remove oxygen from a void space within the vessel. In some embodiments, the desiccant/deoxidant media is packaged in a fibrous pillow with a porous design that is capable of allowing oxygen exchange.

The preservative or desiccant/deoxidant media may be an oxygen scavenging material. The vessel may comprise an oxygen scavenging material. The oxygen scavenging material may capable of removing or decreasing the level of oxygen within the hermetically sealed vessel. In some embodiments, the oxygen scavenging material may be in the form of an oxygen sequestering compound. For example, the oxygen scavenging material may be an oxidative compound. In some embodiments, the oxygen scavenging material comprises a ferrous compound, catechol, ascorbate, ascorbic acid, sodium hydrogen carbonate, citrus extract, an oxidative enzyme, an unsaturated hydrocarbon, a polyamide, or combinations thereof. The oxygen scavenging material may further include a catalyst to assist in oxidation. For example, the oxygen scavenging material may include a metal halide catalyst. The oxygen scavenging material may include sodium chloride or palladium.

The oxygen scavenging material may be packaged in a gas permeable container. The gas permeable container may be water permeable or impermeable. The gas permeable container may comprise a gas permeable sachet, a perforated container, a fabric container, a cardboard or paper container, or a polymer container. In other embodiments, the oxygen scavenging material may be part of a packaging film or structure. For instance, the oxygen scavenging material may line or be part of a vessel structure. The gas permeable container may be attached to the liquid impermeable compartment holding the ion exchange resin. In some embodiments, the gas permeable container may be contained on a layered strip around the liquid impermeable compartment. In some embodiments, a portion of the liquid impermeable compartment may be removable to expose the oxygen scavenging material.

The vessel may comprise an indicator of oxygen contamination. In some embodiments, the indicator may comprise a redox indicator in a transparent packaging. The redox indicator may be a first color when in a reduced form. Upon exposure to a predetermined concentration of an oxidant, for example, oxygen, the redox indicator may oxidize and turn a second color. Thus, the redox indicator may provide a visual indication of oxygen contamination within the vessel. The indicator of oxygen contamination may be positioned such that it reacts with potential oxidants inside the vessel but is visible from the exterior of the vessel, for example, through a window. Thus, the indicator may be visible without opening the hermetic seal of the vessel.

The indicator of oxygen contamination may have a redox midpoint potential $E^0$ between about −0.05 V and about +0.06 V at pH 7 and 25° C. For instance, the indicator of oxygen contamination may have a redox midpoint potential $E^0$ between about −0.05 V and about −0.04 V, between about −0.02 V and about +0.02 V, or between about +0.05 V and +0.06 V at pH 7 and 25° C. The indicator of oxygen contamination may comprise, for example, indigo tetrasulfonic acid, methylene blue, or thionine.

The preservative, oxygen scavenging material, or indicator of oxygen contamination may be independently or jointly positioned in a designated compartment within the vessel. In some embodiments, the preservative, oxygen scavenging material, or indicator of oxygen contamination may be positioned within the gas impermeable vessel but outside the liquid impermeable compartment which holds the ion exchange resin and deoxygenated water. In general, the preservative, oxygen scavenging material, or indicator of oxygen contamination may be positioned such that they do not come into direct contact with moisture. Thus, in some embodiments, the preservative, oxygen scavenging material, or indicator of oxygen contamination may be positioned between an exterior wall of the liquid impermeable compartment which holds the ion exchange resin and deoxygenated water and an interior wall of the gas impermeable vessel.

In some embodiments, the virgin ion exchange resin material may be cation exchange resin. In some embodiments, the virgin ion exchange resin material may be anion exchange resin. In yet other embodiments, the virgin ion exchange resin material may be mixed cation exchange resin and anion exchange resin. The conditions of storage for the vessel, for example temperature, pressure, and/or concentration of dissolved gases in the deoxygenated water, may vary depending on the type of ion exchange resin contained within the vessel. For example, in general continuous exposure of anion resins to greater than about 0.05 ppm free chlorine should be avoided. At a feed temperature of between about 5° C. and about 10° C., standard crosslinked anion resin may be able to withstand free chlorine levels up to about 0.3 ppm, highly crosslinked anion resin may be able to withstand free chlorine levels up to about 0.5 ppm, and macroporous anion resin may be able to withstand free chlorine levels up to about 1 ppm. At a feed temperature of between about 20° C. and about 30° C., standard crosslinked anion resin may be able to withstand free chlorine levels only less than 0.1 ppm, highly crosslinked anion resin may be able to withstand free chlorine levels up to about 0.1 ppm, and macroporous anion resin may be able to withstand free chlorine levels up to about 0.5 ppm. Some cation exchange resin, for example, the DIAION® SK1B resin available from the Mitsubishi Chemical Corporation may have a free chlorine tolerance of about 0.6 mg/L at temperatures between about 5° C. and about 10° C. and a free chlorine tolerance of about 0.1 mg/L at temperatures between about 20° C. and about 25° C. The presence of catalysis, for example, iron or copper may reduce the oxidant levels to which the resins may be exposed without significant degradation.

In accordance with another aspect there is provided a system comprising a vessel including virgin ion exchange resin material and deoxygenated water. The vessel may be gas impermeable and capable of being hermetically sealed, as previously described. The vessel may be connected or connectable downstream from a source of deoxygenated water. The vessel may be connected or connectable downstream from a source of ion exchange resin material. In some embodiments, the vessel is connected or connectable upstream from a drain for used deoxygenated water. The vessel may be connected or connectable upstream from a point of use for the virgin ion exchange resin material, for example, via a hose.

In some embodiments, the system comprises an oxygen monitor. The oxygen monitor may be connected to the vessel and configured to measure a concentration of oxygen within the vessel. The system may comprise a degasifier, for example an in-line degasifier. The degasifier may be a deoxygenation membrane. For example, the deoxygenation membrane may be provided by Liqui-Cel® Membrane Contactors (3M Industrial Group, Maplewood, MN). The degasifier may be a vacuum degasifier. The degasifier may be a column or other device containing an oxygen scavenging resin. The oxygen scavenging resin may include an oxygen scavenging material as previously described. In some embodiments, the oxygen scavenging resin may include a catalyst. The catalyst may include a metal halide. In some embodiments, the catalyst may include sodium chloride. The catalyst may include palladium or a palladium compound, for example, palladium chloride. The degasifier may be fluidly connected or connectable upstream from the vessel. The degasifier may be fluidly connected or connectable downstream from a source of non-deoxygenated water and configured to deoxygenate the non-deoxygenated water.

The system may further comprise a sensor or monitor, for example, a pressure sensor or thermometer. The sensor and/or monitor may be positioned upstream from the vessel and configured to measure temperature, pressure, pH, conductivity, and/or composition of deoxygenated or non-deoxygenated water. The sensor and/or monitor may be electrically connected to a control module. The control module may be configured to control one or more parameter of the in-line degasifier responsive to a measurement received from the sensor and/or monitor. The control module may be connected to the oxygen monitor. The control module may be configured to control one or more parameter of the in-line degasifier responsive to a measurement received from the oxygen monitor.

As shown in FIG. 1, the vessel 100 may comprise virgin ion exchange resin material and deoxygenated water. The vessel 100 may have an opening 110, an inlet 120, and an outlet 130. The opening, inlet, and/or outlet may be capable of being hermetically sealed. The inlet may be connectable to a source of deoxygenated water 140 or a source of ion exchange resin material 150. The outlet may be connectable to a drain 160 or a point of use for the ion exchange resin material 170.

Figure 2:
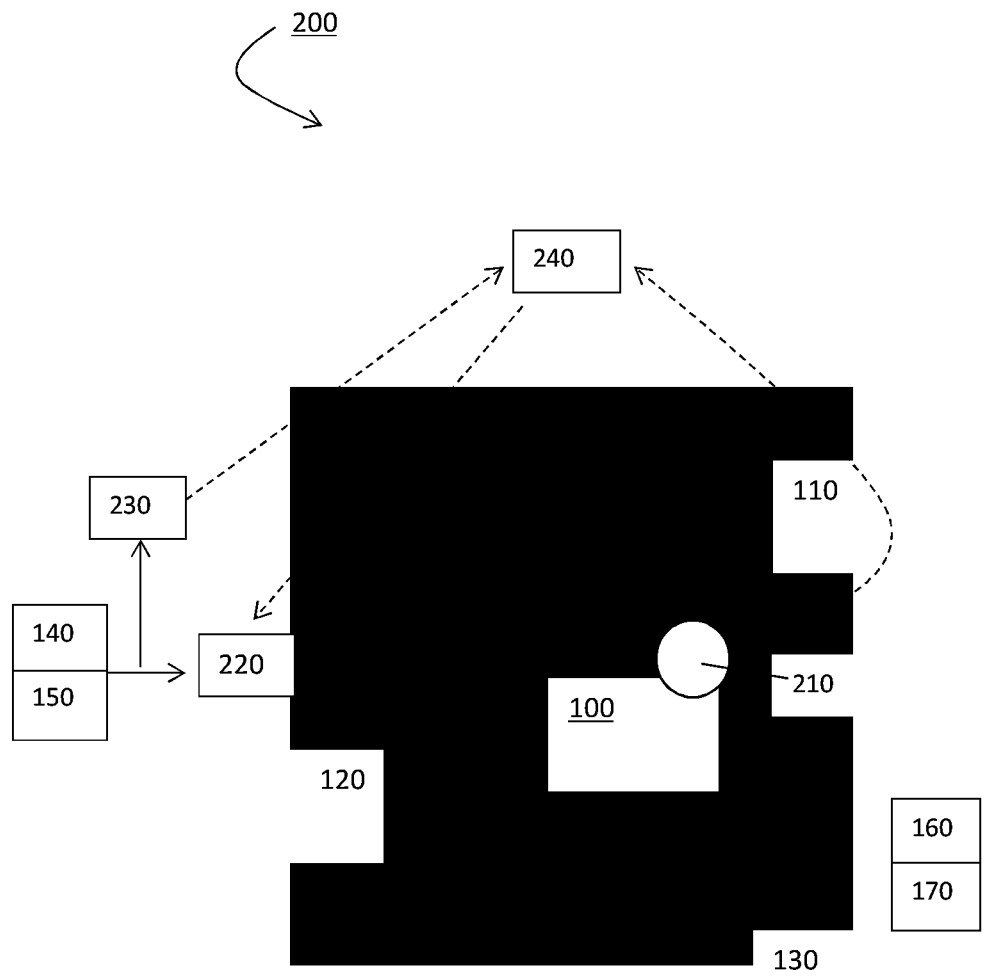
FIG. 2 is a schematic drawing of a system comprising a vessel, according to an embodiment disclosed herein.

As shown in FIG. 2, the system 200 may comprise a vessel 100, having an opening 110, an inlet 120, and an outlet 130. The system may further comprise an oxygen monitor 210, a degasifier 220, a sensor or monitor 230, and a control module 240.

Figure 3:
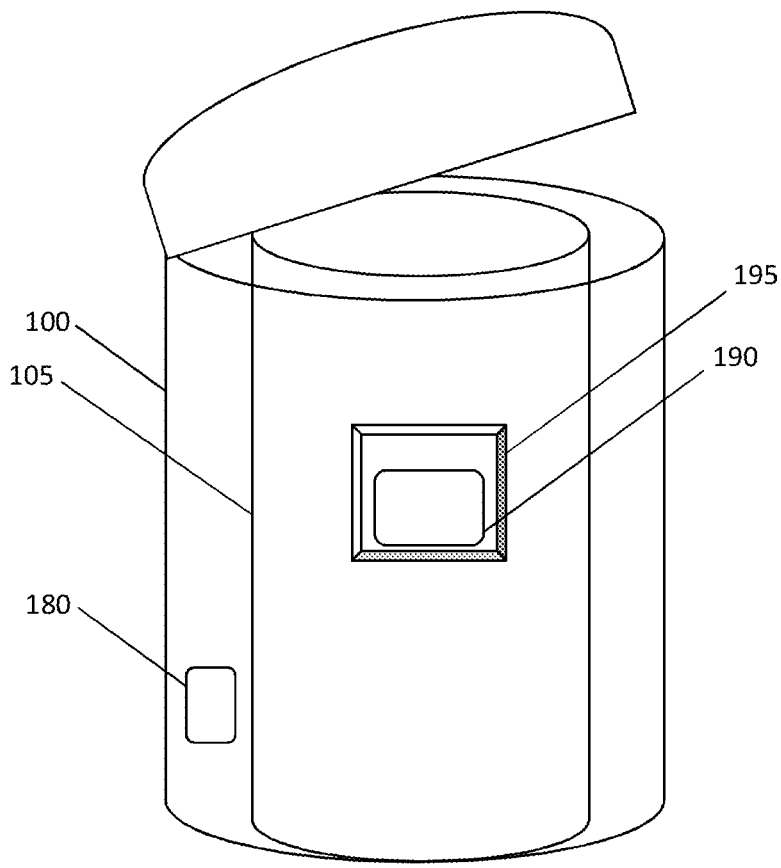
FIG. 3 is a schematic drawing of a vessel, according to an embodiment disclosed herein.

As shown in FIG. 3, the vessel 100 may have a compartment 105 configured to hold the virgin ion exchange resin material and deoxygenated water. A container 180 holding a preservative or oxygen scavenging material may be positioned in the interstitial space exterior to the compartment 105. An indicator of oxygen contamination 190 may be viewable through a viewing window 195 of the vessel 100. The vessel of FIG. 3 may have an inlet and outlet (not shown) in in fluid communication with the container 180. For example, the vessel may contain an inlet or outlet in fluid communication with the liquid impermeable container which holds the ion exchange resin and deoxygenated water.

EXAMPLES

Example 1: Application of the Gas Impermeable Vessel Comprising Cation Resin

In one exemplary application, a cation exchange resin that is used in a delithiating application has had issues with sulfates leaching from the resin prior to being used. Conventionally, the resin is rinsed before being put online and the rinse water is drained to a hot well which is radioactive. The radioactive hot well has limitations on the volume of rinse water that it can accept. Furthermore, it is expensive to treat radioactive water from the hot well.

The usage of a gas impermeable vessel comprising ion exchange resin material and deoxygenated water may allow the ion exchange resin to be rinsed prior to use in a non-hot area of the plant, for example, where there are no restrictions on the amount of rinse water generated. The rinse water can go to a common drain and the resin could then be transported to vessels in a radioactive area by hoses.

Example 2: Stability of Stored Virgin Ion Exchange Resin Material

Experiments were performed to test whether various methods would lessen or prevent degradation of the ion exchange resin. After treating the ion exchange resins and storing them for a specified period, the resins were tested for degradation. Organic sulfate compound ($SO_4$) concentration was measured by UV light adsorption to determine degree of degradation of the resin. The results are presented in Table 1.

The experimental lots (E) were rinsed with deoxygenated water and packaged in a gas impermeable vessel with an oxygen scavenging sachet, as described above. The comparison lots (C) were processed and stored by various conventional methods.

TABLE 1

Degradation of Ion Exchange Resin in Storage Measured as Increase in Organic Sulfate

| Lot # | Days Stored | Initial $SO_4$ Rinse (ppm) | Final $SO_4$ Rinse (ppm) | $SO_4$ Increase Rate |
|---|---|---|---|---|
| E1 | 90 | 0.166 | 0.1 | 0 |
| E2 | 180 | 0.166 | 0.212 | 0.00026 |
| C1 | 11 | 0.007 | 0.639 | 0.057 |
| C2 | 204 | 0.989 | 6.96 | 0.029 |
| C3 | 101 | 0.285 | 3.78 | 0.035 |
| C4 | N/A | Not tested | 8.42 | N/A |
| C5 | 101 | 0.163 | 4.05 | 0.038 |
| C6 | 14 | 0.022 | 0.109 | 0.006 |
| C7 | 14 | 0.013 | 0.087 | 0.005 |
| C8 | 14 | 0.008 | 0.156 | 0.0106 |
| C9 | 14 | 0.02 | 0.308 | 0.0206 |
| C10 | 14 | 0.007 | 0.368 | 0.026 |
| C11 | 14 | 0.044 | 1.07 | 0.073 |

TABLE 1-continued

Degradation of Ion Exchange Resin in Storage
Measured as Increase in Organic Sulfate

| Lot # | Days Stored | Initial SO$_4$ Rinse (ppm) | Final SO$_4$ Rinse (ppm) | SO$_4$ Increase Rate |
|---|---|---|---|---|
| C12 | 14 | 0.004 | 0.727 | 0.052 |
| C13 | 14 | 0.024 | 0.52 | 0.035 |
| C14 | 14 | 0.007 | 0.151 | 0.01 |
| C15 | 69 | 0.035 | 24.52 | 0.355 |

The results show a decrease in rate of degradation when treating and storing the ion exchange resins by the methods disclosed herein. The experimental samples had a significantly lower SO$_4$ increase rate than the measured comparison samples. Thus, the experimental samples were found to be 20 to 1500 times more stable, when measured as compared to the conventional ion exchange resin samples. Accordingly, the methods disclosed herein provide increased stability for ion exchange resin after storage for an extended period of time.

Example 3: Effect of Temperature on Stored Virgin Ion Exchange Resin Material

Experiments were performed to test the rate of degradation of the ion exchange resins with increasing temperature. Ion exchange resin was tested by measuring total organic carbon (TOC) after heating in 500 mL of water for one week while bubbling air through the solution. Table 2 shows the comparable amount of degradation for ion exchange resin maintained at room temperature.

TABLE 2

Comparative Degradation of Ion Exchange
Resin with Increased Temperature

| Test Heating Temperature for 1 week (° C.) | Comparative Degradation at 20° C. (time) |
|---|---|
| 20 | 1 week |
| 30 | 2 weeks |
| 40 | 4 weeks |
| 50 | 8 weeks |
| 60 | 16 weeks |
| 70 | 32 weeks |
| 80 | 64 weeks |

Every 10° C. increase in temperature resulted in a two-fold increase in rate of degradation as compared to holding the ion exchange resin in room temperature for the same amount of time. Thus, temperature appears to have an adverse effect on rate of degradation of ion exchange resin. Accordingly, degradation may be lessened or prevented by refraining from increasing temperature by more than 10° C., as disclosed herein.

Example 4: TOC Reduction Trials

Batch trials were performed to determine an appropriate cleanser for ion exchange resin. The samples contained 150 mL of an industrial grade, chloride form, polystyrene-based, anion exchange resin in 400 mL of deionized water and a sample cleanser (at varying concentrations). The samples were stirred for two hours at 60° C. and 150 rpm. After stirring the ion exchange resin samples were rinsed with deionized water. The samples were scanned by ultraviolet/visible spectroscopy at 1 hour and 2 hours of stirring and tested by gas chromatography/mass spectrometry thereafter.

The cleansers tested were isopropanol, ammonia, ethoxylated octyl phenol (Triton™ X-100, distributed by Sigma-Aldrich® Corporation, St. Louis, MO), ammonia peroxide (oxidant control), ethanolamine, methanol, and sodium percarbonate. An additional control was tested with high purity deionized water. The concentration of oxygenated TOC species found after treatment were added to give a final concentration of TOC in the resin after cleansing. The results are presented in the graphs of FIGS. 4 and 5A-C.

Figure 4:
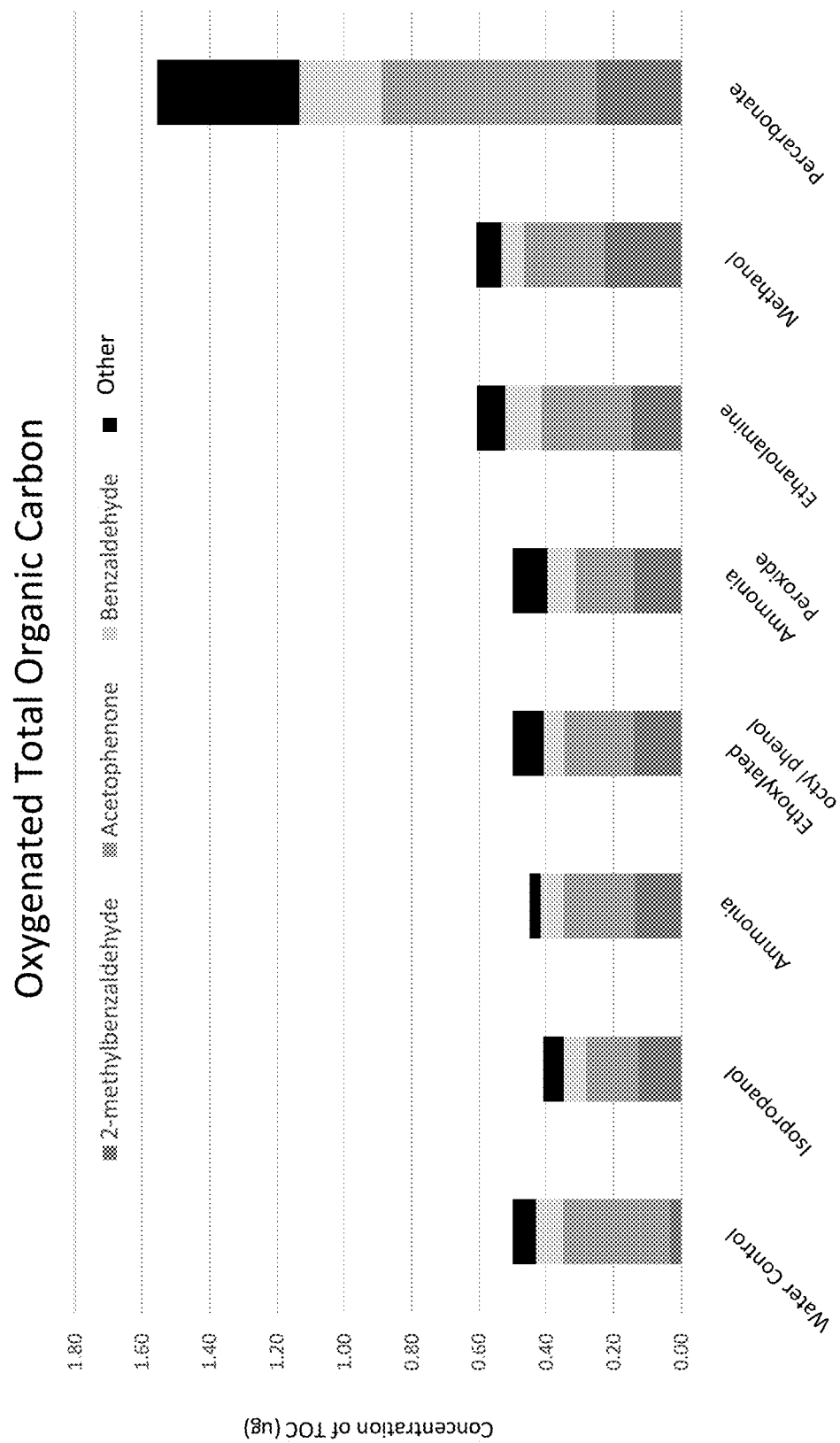
FIG. 4 is a graph of comparative amounts of oxygenated total organic carbon on the ion exchange resin after cleansing with various cleansers, according to one embodiment disclosed herein.

Briefly, as shown in FIG. 4, treatment with isopropanol decreased the concentration of oxygenated TOC as compared to the water control; treatment with ammonia decreased the concentration of oxygenated TOC as compared to the water control; treatment with ethoxylated octyl phenol provided similar results as the water control; treatment with the ammonia peroxide control also provided similar results as the water control; treatment with ethanolamine slightly increased the concentration of oxygenated TOC as compared to the water control; treatment with methanol slightly increased the concentration of oxygenated TOC as compared to the water control; and treatment with percarbonate significantly increased the concentration of oxygenated TOC as compared to the water control.

It is noted that the concentrations tested were above the critical micelle concentration (CMC) for certain cleansers. Thus, it is believed that each of ethoxylated octyl phenol, ethanolamine, and methanol cleansers can provide better results than the water control when used at a lower concentration, for example, at a concentration below their critical micelle concentration (for the detergents).

Figure 5A:
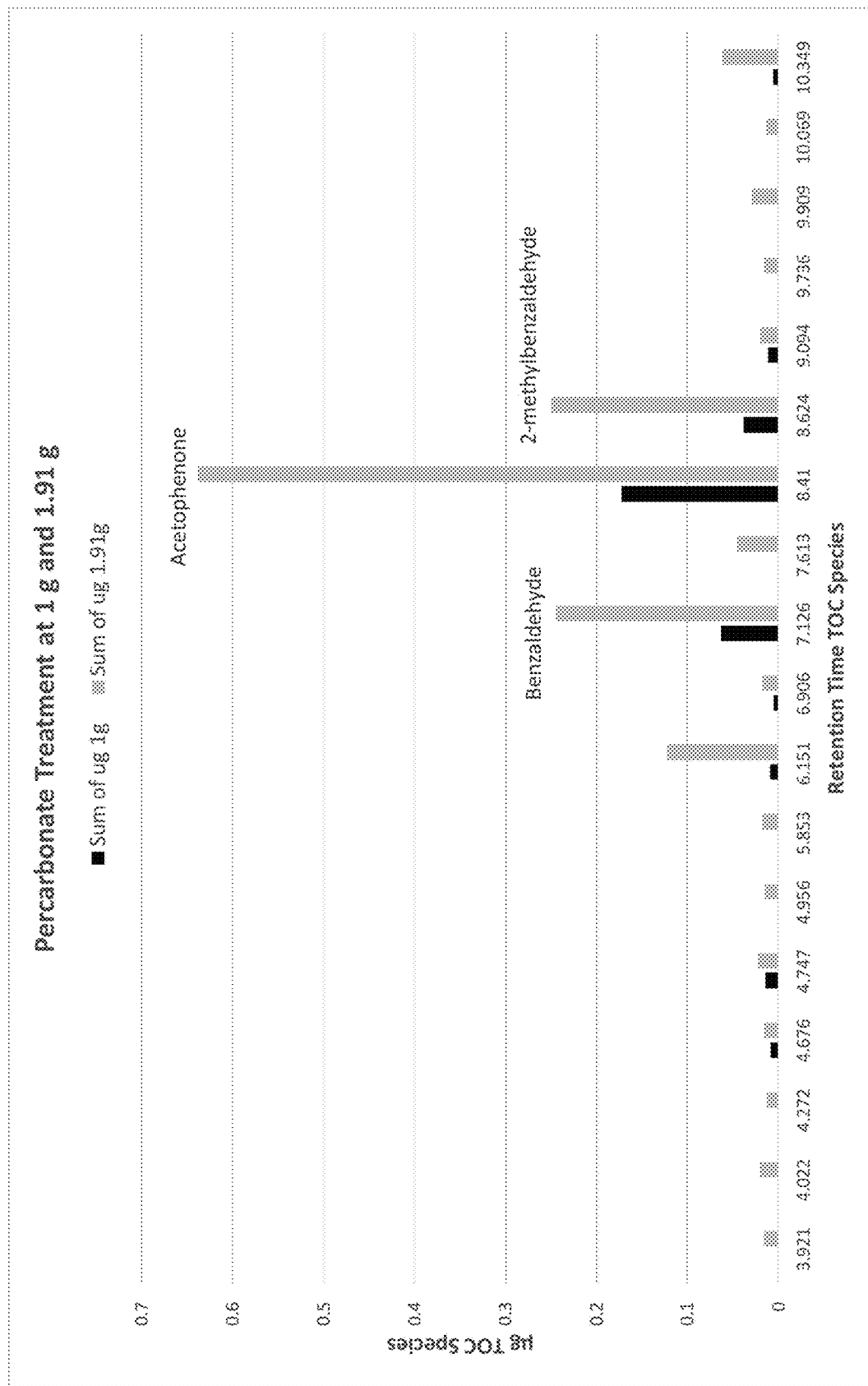
FIG. 5A is a graph of the concentration of oxygenated total organic carbon on the ion exchange resin after cleansing with various concentrations of percarbonate.
Figure 5B:
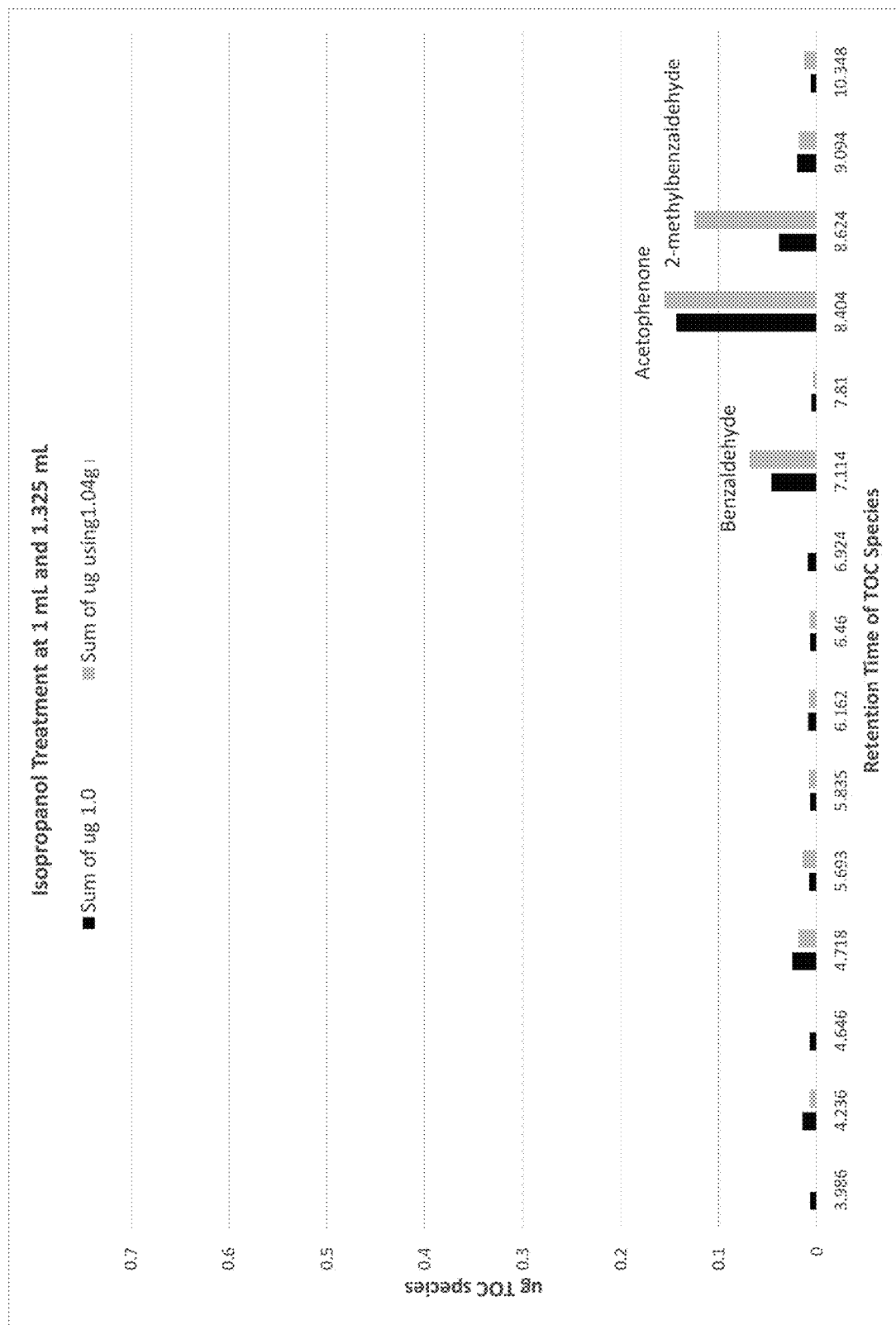
FIG. 5B is a graph of the concentration of oxygenated total organic carbon on the ion exchange resin after cleansing with various concentrations of isopropanol.
Figure 5C:
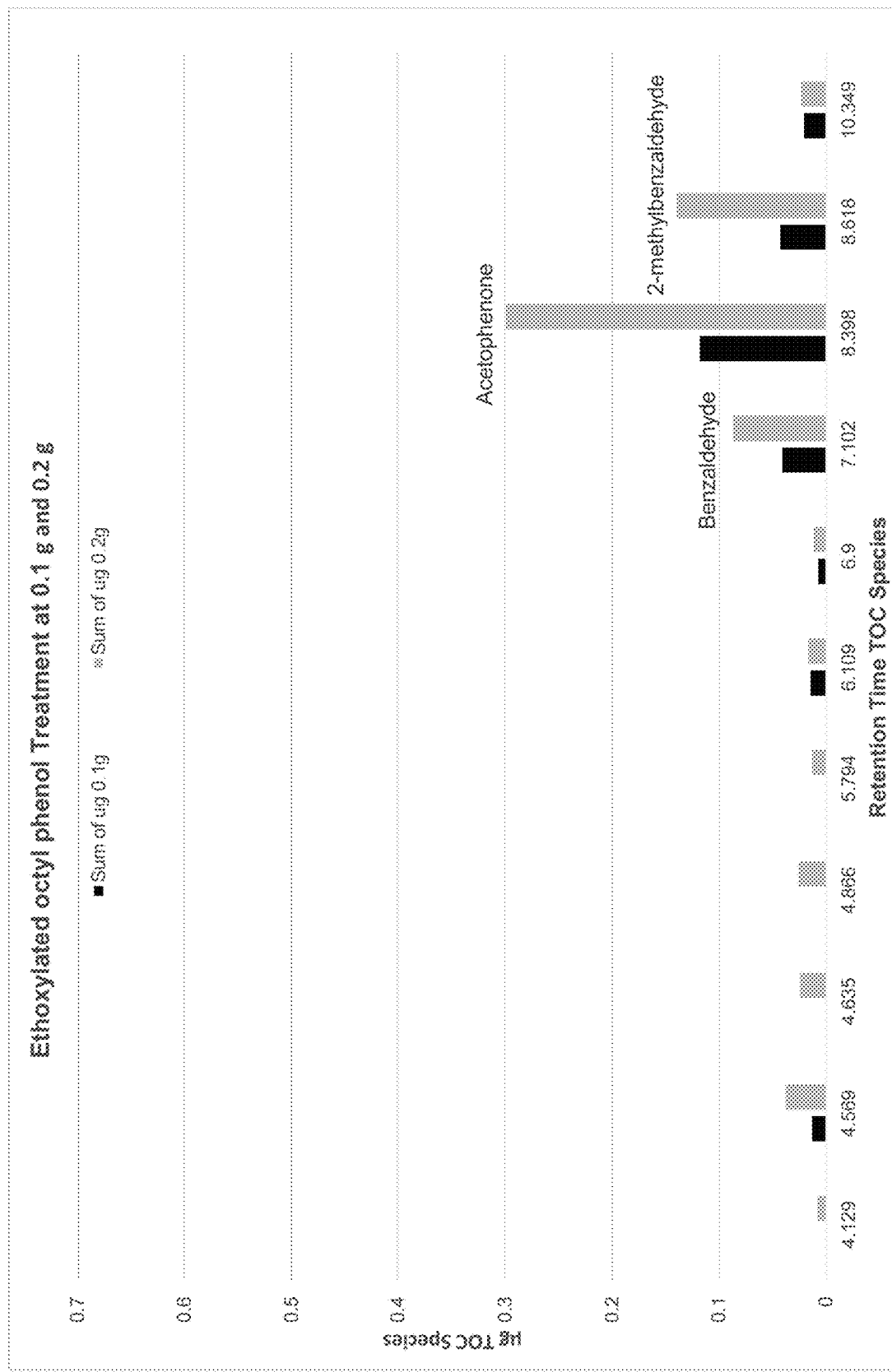
FIG. 5C is a graph of the concentration of oxygenated total organic carbon on the ion exchange resin after cleansing with various concentrations of ethoxylated octyl phenol.

As shown in FIGS. 5A-C, percarbonate, isopropanol, and ethoxylated octyl phenol were each tested at two concentrations for comparison. The results for cleansing preparations with 1 g and 1.91 g (2.5 g/L and 4.775 g/L, respectively) of percarbonate are presented in FIG. 5A. Percarbonate is believed to increase oxidative degradation of the ion exchange resin at all tested and extrapolated concentrations.

The results for cleansing preparations with 1 mL and 1.325 mL (0.25% and 0.33% respectively) of isopropanol are presented in FIG. 5B. Both isopropanol concentrations tested provided excellent results. However, the lower concentration of isopropanol provided slightly better results. For example, when cleansing with 0.33% isopropanol, 0.16 µg of acetophenone were detected. When cleansing with 0.25% isopropanol, 0.14 µg of acetophenone were detected.

The results for cleansing preparations with 0.1 g and 0.2 g (0.25 g/L and 0.5 g/L, respectively) of ethoxylated octyl phenol are presented in FIG. 5C. The lower concentration of ethoxylated octyl phenol provided better results. For example, when cleansing with 0.5 g/L ethoxylated octyl phenol, 0.3 µg of acetophenone were detected. When cleansing with 0.25 g/L ethoxylated octyl phenol, 0.12 µg of acetophenone were detected. Upon extrapolation of the data presented in FIG. 5C to a concentration of 0.05 g (0.125 g/L) of ethoxylated octyl phenol, the concentration of oxygenated TOC significantly decreases and becomes almost negligible. It is noted that 0.125 g/L of ethoxylated octyl phenol is its critical micelle concentration.

Accordingly, many of the tested cleansers are able to remove oxygenated impurities from the ion exchange resin. Isopropanol and ethoxy octyl phenol provide better removal of impurities at lower concentrations. In particular, ethoxy octyl phenol is believed to provide excellent removal of impurities at or below its critical micelle concentration.

Based on the cleansers tested, other soluble alcohols and non-ionic detergents are expected to provide similar results at dilute concentrations.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Those skilled in the art should appreciate that the parameters and configurations described herein are exemplary and that actual parameters and/or configurations will depend on the specific application in which the disclosed methods and materials are used. Those skilled in the art should also recognize or be able to ascertain, using no more than routine experimentation, equivalents to the specific embodiments disclosed. For example, those skilled in the art may recognize that the method, and components thereof, according to the present disclosure may further comprise a network or systems containing ion exchange resins or gas impermeable vessels disclosed herein. It is therefore to be understood that the embodiments described herein are presented by way of example only and that, within the scope of the appended claims and equivalents thereto: the disclosed embodiments may be practiced otherwise than as specifically described. The present systems and methods are directed to each individual feature, system, or method described herein. In addition, any combination of two or more such features, systems, or methods, if such features, systems, or methods are not mutually inconsistent, is included within the scope of the present disclosure. The steps of the methods disclosed herein may be performed in the order illustrated or in alternate orders and the methods may include additional or alternative acts or may be performed with one or more of the illustrated acts omitted.

Further, it is to be appreciated that various alterations, modifications, and improvements will readily occur to those skilled in the art. Such alterations, modifications, and improvements are intended to be part of this disclosure, and are intended to be within the spirit and scope of the disclosure. In other instances, an existing facility may be modified to utilize or incorporate any one or more aspects of the methods and systems described herein. Thus, in some instances, the systems may involve connecting or configuring an existing facility to perform a method of reducing a rate of oxidative degradation of an ion exchange resin, or to house or utilize an ion exchange resin or gas impermeable vessel, as described herein. Accordingly the foregoing description and FIGURES are by way of example only. Further the depictions in the FIGURES do not limit the disclosures to the particularly illustrated representations.

While exemplary embodiments of the disclosure have been disclosed, many modifications, additions, and deletions may be made therein without departing from the spirit and scope of the disclosure and its equivalents, as set forth in the following claims.

The invention claimed is:

1. A method of stabilizing virgin ion exchange resin material, the method comprising:
   cleansing the virgin ion exchange resin material with a preparation comprising an alcohol solvent to produce a cleansed virgin ion exchange resin material, wherein the preparation comprises less than 0.5% isopropanol by volume;
   introducing the cleansed virgin ion exchange resin material into a gas impermeable vessel; and
   hermetically sealing the vessel.

2. The method of claim 1, further comprising rinsing the cleansed virgin ion exchange resin material with deoxygenated water.

3. The method of claim 1, comprising introducing the cleansed virgin ion exchange resin into a liquid impermeable container of the gas impermeable vessel.

4. A method of stabilizing virgin ion exchange resin material, the method comprising:
   cleansing the virgin ion exchange resin material with a preparation comprising an alcohol solvent to produce a cleansed virgin ion exchange resin material, wherein the preparation comprises less than 0.5% isopropanol by volume; and
   rinsing the cleansed virgin ion exchange resin material with deoxygenated water to produce a rinsed virgin ion exchange resin material.

5. The method of claim 4, comprising rinsing the cleansed ion exchange resin material with deoxygenated water having a concentration of dissolved oxygen of less than about 10 ppb.

6. The method of claim 4, further comprising introducing the rinsed virgin ion exchange resin material into a gas impermeable vessel and hermetically sealing the vessel.

* * * * *